(12) United States Patent
Cronie et al.

(10) Patent No.: US 9,401,828 B2
(45) Date of Patent: Jul. 26, 2016

(54) METHODS AND SYSTEMS FOR LOW-POWER AND PIN-EFFICIENT COMMUNICATIONS WITH SUPERPOSITION SIGNALING CODES

(75) Inventors: Harm Cronie, Lausanne (CH); Amin Shokrollahi, Preverenges (CH)

(73) Assignee: KANDOU LABS, S.A. (CH)

( * ) Notice: Subject to any disclaimer, the term of this patent is extended or adjusted under 35 U.S.C. 154(b) by 579 days.

(21) Appl. No.: 13/176,657

(22) Filed: Jul. 5, 2011

(65) Prior Publication Data

US 2013/0010892 A1 Jan. 10, 2013

(51) Int. Cl.
*H04K 1/02* (2006.01)
*H04L 25/02* (2006.01)
*H04L 25/49* (2006.01)

(52) U.S. Cl.
CPC ........ *H04L 25/0276* (2013.01); *H04L 25/0282* (2013.01); *H04L 25/4917* (2013.01)

(58) Field of Classification Search
CPC ............ H04L 25/0276; H04L 25/4917; H04L 25/0282; H04L 1/0041; H04L 1/0057; H03M 5/04; H03M 5/16; H03M 13/31; H04B 1/7105; H04B 1/7117; H04B 1/7107
USPC ............ 375/257, 296, 340, 259; 714/776, 43, 714/755, 777
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |
| 4,276,543 A | 6/1981 | Miller |
| 4,486,739 A | 12/1984 | Franaszek et al. |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS ("Multiwire Differential Signaling", John W. Poulton, Stephen Tell, and Robert Palmer UNC-CH Department of Computer Science Version 1.1, Aug. 6, 2003.*

(Continued)

*Primary Examiner* — Helene Tayong
(74) *Attorney, Agent, or Firm* — Invention Mine LLC

(57) ABSTRACT

A communication system uses a bus to transmit information, by receiving signals and mapping them to a second set of signals representing codewords of a superposition signaling code, and transmitting the second set of signals. The superposition signaling code can comprise more than one layer. The pin-efficiency can be larger than 1. The system may encode bits into a codeword of a superposition signaling code that is defined by two basis vectors of predetermined size and then have two encoders for permutation modulation codes defined by the basis vectors. The bits of information are divided into a first part representing a predetermined number of bits and a second part representing a predetermined number of bits, with the parts provided to the respective encoding circuits and their outputs combined by a superposition.

19 Claims, 27 Drawing Sheets

(56) References Cited

U.S. PATENT DOCUMENTS

| | | | |
|---|---|---|---|
| 4,499,550 A | 2/1985 | Ray et al. | |
| 4,774,498 A | 9/1988 | Traa | |
| 4,864,303 A | 9/1989 | Ofek | |
| 4,897,657 A | 1/1990 | Brubaker | |
| 5,053,974 A * | 10/1991 | Penz | 706/18 |
| 5,166,956 A | 11/1992 | Baltus et al. | |
| 5,168,509 A | 12/1992 | Nakamura et al. | |
| 5,283,761 A | 2/1994 | Gillingham | |
| 5,287,305 A | 2/1994 | Yoshida | |
| 5,412,689 A | 5/1995 | Chan et al. | |
| 5,459,465 A | 10/1995 | Kagey | |
| 5,511,119 A | 4/1996 | Lechleider | |
| 5,553,097 A | 9/1996 | Dagher | |
| 5,599,550 A | 2/1997 | Kohlruss et al. | |
| 5,659,353 A | 8/1997 | Kostreski et al. | |
| 5,825,808 A | 10/1998 | Hershey et al. | |
| 5,875,202 A | 2/1999 | Venters | |
| 5,945,935 A | 8/1999 | Kusumoto | |
| 5,995,016 A | 11/1999 | Perino | |
| 6,005,895 A | 12/1999 | Perino et al. | |
| 6,084,883 A | 7/2000 | Norrell et al. | |
| 6,172,634 B1 | 1/2001 | Leonowich et al. | |
| 6,175,230 B1 | 1/2001 | Hamblin et al. | |
| 6,232,908 B1 | 5/2001 | Nakaigawa | |
| 6,278,740 B1 | 8/2001 | Nordyke | |
| 6,346,907 B1 | 2/2002 | Dacy | |
| 6,359,931 B1 | 3/2002 | Perino et al. | |
| 6,404,820 B1 | 6/2002 | Postol | |
| 6,417,737 B1 | 7/2002 | Moloudi et al. | |
| 6,452,420 B1 | 9/2002 | Wong | |
| 6,483,828 B1 | 11/2002 | Balachandran | |
| 6,504,875 B2 | 1/2003 | Perino et al. | |
| 6,509,773 B2 | 1/2003 | Buchwald | |
| 6,555,578 B2 | 4/2003 | Cornelius et al. | |
| 6,556,628 B1 | 4/2003 | Poulton et al. | |
| 6,563,382 B1 | 5/2003 | Yang et al. | |
| 6,621,427 B2 | 9/2003 | Greenstreet | |
| 6,650,638 B1 | 11/2003 | Walker et al. | |
| 6,661,355 B2 | 12/2003 | Cornelius et al. | |
| 6,766,342 B2 | 7/2004 | Kechriotis | |
| 6,839,429 B1 | 1/2005 | Gaikwad | |
| 6,954,492 B1 | 10/2005 | Williams | |
| 6,990,138 B2 | 1/2006 | Bejjani | |
| 6,999,516 B1 | 2/2006 | Rajan | |
| 7,023,817 B2 | 4/2006 | Kuffner | |
| 7,053,802 B2 | 5/2006 | Cornelius | |
| 7,085,153 B2 | 8/2006 | Ferrant et al. | |
| 7,142,612 B2 | 11/2006 | Horowitz et al. | |
| 7,142,865 B2 | 11/2006 | Tsai | |
| 7,167,019 B2 | 1/2007 | Broyde et al. | |
| 7,180,949 B2 | 2/2007 | Kleveland et al. | |
| 7,184,483 B2 | 2/2007 | Rajan | |
| 7,356,213 B1 | 4/2008 | Cunningham et al. | |
| 7,358,869 B1 * | 4/2008 | Chiarulli et al. | 341/58 |
| 7,362,130 B2 | 4/2008 | Broyde et al. | |
| 7,389,333 B2 | 6/2008 | Moore et al. | |
| 7,633,850 B2 | 12/2009 | Ahn | |
| 7,656,321 B2 | 2/2010 | Wang | |
| 7,706,524 B2 | 4/2010 | Zerbe | |
| 7,746,764 B2 | 6/2010 | Rawlins et al. | |
| 7,787,572 B2 | 8/2010 | Scharf et al. | |
| 7,882,413 B2 | 2/2011 | Chen et al. | |
| 7,933,770 B2 | 4/2011 | Kruger et al. | |
| 8,050,332 B2 | 11/2011 | Chung et al. | |
| 8,064,535 B2 | 11/2011 | Wiley | |
| 8,091,006 B2 | 1/2012 | Prasad et al. | |
| 8,106,806 B2 | 1/2012 | Toyomura | |
| 8,159,375 B2 | 4/2012 | Abbasfar | |
| 8,159,376 B2 | 4/2012 | Abbasfar | |
| 8,199,849 B2 | 6/2012 | Oh | |
| 8,279,094 B2 | 10/2012 | Abbasfar | |
| 8,295,250 B2 | 10/2012 | Gorokhov | |
| 8,310,389 B1 | 11/2012 | Chui | |
| 8,429,495 B2 | 4/2013 | Przybylski | |
| 8,442,099 B1 | 5/2013 | Sederat | |
| 8,442,210 B2 | 5/2013 | Zerbe | |
| 8,443,223 B2 | 5/2013 | Abbasfar | |
| 8,462,891 B2 | 6/2013 | Kizer et al. | |
| 8,520,493 B2 | 8/2013 | Goulahsen | |
| 8,539,318 B2 | 9/2013 | Cronie et al. | |
| 8,547,272 B2 | 10/2013 | Nestler et al. | |
| 8,578,246 B2 | 11/2013 | Mittelholzer | |
| 8,588,280 B2 | 11/2013 | Oh et al. | |
| 8,593,305 B1 | 11/2013 | Tajalli et al. | |
| 8,649,445 B2 | 2/2014 | Cronie | |
| 8,649,460 B2 | 2/2014 | Ware et al. | |
| 8,718,184 B1 | 5/2014 | Cronie | |
| 8,782,578 B2 | 7/2014 | Tell | |
| 8,989,317 B1 | 3/2015 | Holden | |
| 9,077,386 B1 | 7/2015 | Holden | |
| 2001/0006538 A1 | 7/2001 | Simon et al. | |
| 2001/0055344 A1 | 12/2001 | Lee et al. | |
| 2002/0034191 A1 * | 3/2002 | Shattil | 370/464 |
| 2002/0044316 A1 | 4/2002 | Myers | |
| 2002/0057592 A1 | 5/2002 | Robb | |
| 2002/0163881 A1 | 11/2002 | Dhong | |
| 2002/0174373 A1 | 11/2002 | Chang | |
| 2003/0048210 A1 | 3/2003 | Kiehl | |
| 2003/0071745 A1 | 4/2003 | Greenstreet | |
| 2003/0105908 A1 | 6/2003 | Perino et al. | |
| 2003/0146783 A1 | 8/2003 | Bandy et al. | |
| 2003/0227841 A1 | 12/2003 | Tateishi et al. | |
| 2004/0003336 A1 | 1/2004 | Cypher | |
| 2004/0003337 A1 | 1/2004 | Cypher | |
| 2004/0057525 A1 | 3/2004 | Rajan et al. | |
| 2004/0086059 A1 * | 5/2004 | Eroz et al. | 375/298 |
| 2004/0156432 A1 | 8/2004 | Hidaka | |
| 2005/0057379 A1 | 3/2005 | Jansson | |
| 2005/0135182 A1 | 6/2005 | Perino et al. | |
| 2005/0149833 A1 | 7/2005 | Worley | |
| 2005/0152385 A1 | 7/2005 | Cioffi | |
| 2005/0174841 A1 | 8/2005 | Ho | |
| 2005/0213686 A1 | 9/2005 | Love et al. | |
| 2005/0286643 A1 | 12/2005 | Ozawa et al. | |
| 2006/0018344 A1 | 1/2006 | Pamarti | |
| 2006/0115027 A1 | 6/2006 | Srebranig | |
| 2006/0159005 A1 | 7/2006 | Rawlins et al. | |
| 2006/0269005 A1 | 11/2006 | Laroia et al. | |
| 2007/0030796 A1 | 2/2007 | Green | |
| 2007/0188367 A1 | 8/2007 | Yamada | |
| 2007/0260965 A1 | 11/2007 | Schmidt et al. | |
| 2007/0263711 A1 | 11/2007 | Kramer et al. | |
| 2007/0283210 A1 | 12/2007 | Prasad et al. | |
| 2008/0104374 A1 | 5/2008 | Mohamed | |
| 2008/0159448 A1 | 7/2008 | Anim-Appiah et al. | |
| 2008/0169846 A1 | 7/2008 | Lan et al. | |
| 2008/0273623 A1 | 11/2008 | Chung et al. | |
| 2008/0284524 A1 | 11/2008 | Kushiyama | |
| 2009/0059782 A1 | 3/2009 | Cole | |
| 2009/0092196 A1 | 4/2009 | Okunev | |
| 2009/0132758 A1 | 5/2009 | Jiang | |
| 2009/0154030 A1 | 6/2009 | Diab et al. | |
| 2009/0163612 A1 | 6/2009 | Brady et al. | |
| 2009/0185636 A1 | 7/2009 | Palotai et al. | |
| 2009/0193159 A1 | 7/2009 | Li | |
| 2009/0212861 A1 | 8/2009 | Lim et al. | |
| 2009/0228767 A1 * | 9/2009 | Oh et al. | 714/781 |
| 2009/0257542 A1 | 10/2009 | Evans et al. | |
| 2010/0020898 A1 | 1/2010 | Stojanovic | |
| 2010/0046644 A1 | 2/2010 | Mazet | |
| 2010/0104047 A1 | 4/2010 | Chen et al. | |
| 2010/0180143 A1 | 7/2010 | Ware et al. | |
| 2010/0205506 A1 | 8/2010 | Hara | |
| 2010/0296550 A1 | 11/2010 | Rjeily | |
| 2010/0309964 A1 | 12/2010 | Oh | |
| 2011/0014865 A1 | 1/2011 | Seo et al. | |
| 2011/0051854 A1 | 3/2011 | Kizer et al. | |
| 2011/0084737 A1 | 4/2011 | Oh et al. | |
| 2011/0127990 A1 | 6/2011 | Wilson et al. | |
| 2011/0235501 A1 | 9/2011 | Goulahsen | |
| 2011/0268225 A1 | 11/2011 | Cronie et al. | |
| 2011/0299555 A1 | 12/2011 | Cronie et al. | |
| 2011/0302478 A1 * | 12/2011 | Cronie et al. | 714/777 |
| 2011/0317559 A1 | 12/2011 | Kern et al. | |

(56) References Cited

U.S. PATENT DOCUMENTS

| | | | |
|---|---|---|---|
| 2012/0063291 A1 | 3/2012 | Hsueh | |
| 2012/0161945 A1 | 6/2012 | Single | |
| 2012/0213299 A1* | 8/2012 | Cronie et al. | 375/259 |
| 2013/0010892 A1 | 1/2013 | Cronie et al. | |
| 2013/0051162 A1 | 2/2013 | Amirkhany et al. | |
| 2013/0259113 A1 | 10/2013 | Kumar | |
| 2014/0016724 A1 | 1/2014 | Cronie | |
| 2014/0198837 A1 | 7/2014 | Fox et al. | |
| 2014/0254730 A1 | 9/2014 | Kim et al. | |
| 2015/0010044 A1 | 1/2015 | Zhang | |
| 2015/0078479 A1 | 3/2015 | Whitby-Strevens | |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

David Sleplan ("Permutation modulation",Proceedings of the IEEE (vol. 53) , Mar. 1965, pp. 228-236.*
James She et al ("A Framework of Cross-Layer Superposition Coded Multicast for Robust IPTV Services over WiMAX",IEEE Communications Society subject matter experts for publication in the WCNC 2008 proceedings, Mar. 31, 2008-Apr. 3, 2008 , pp. 3139-3144.*
David Slepian, Permutation Modulation, IEEE, vol. 53, No. 3, Mar. 1965, pp. 228-236.
Aliazam Abbasfar, Generalized Differential Vector Signaling, IEEE International Conference on Communications, 2009, pp. 1-5.
Victor Dasilva et al., Multicarrier Orthogonal Cdma Signals for Quasi-Synchronous Communication Systems, IEEE Journal on Selected Areas in Communications, vol. 12, No. 5, Jun. 1, 1994, pp. 842-852.
Wang et al., Applying CDMA Technique to Network-on-Chip, IEEE Transactions on Very Large Scale Integration (VLSI) Systems, vol. 15, No. 10, Oct. 1, 2007, pp. 1091-1100.
International Search Report and Written Opinion for PCT/EP2011/002170 mailed Jul. 14, 2011.
Mircea Stan et al., Bus-Invert Coding for Low-Power I/O, IEEE Transactions on Very Large Scale Integration (VLSI) Systems, vol. 3, No. 1, Mar. 1995, pp. 49-58.
Luca Tallini et al., Transmission Time Analysis for the Parallel Asynchronous Communication Scheme, IEEE Transactions on Computers, vol. 52, No. 5, May 2003, pp. 558-571.
International Search Report and Written Opinion for PCT/EP2012/052767 mailed May 11, 2012.
Non-final Office Action dated Sep. 21, 2012 in related U.S. Appl. No. 12/784,414, filed May 20, 2010 available on PAIR.
Notice of Allowance dated May 20, 2013 in related U.S. Appl. No. 12/982,777, filed Dec. 30, 2010 available on PAIR.
International Search Report and Written Opinion for PCT/EP2011/059279 mailed Sep. 22, 2011.
International Search Report and Written Opinion of the International Searching Authority, mailed Nov. 5, 2012, in International Patent Application S.N. PCT/EP2012/052767, 7 pages.
International Search Report and Written Opinion for PCT/EP2011/074219 mailed Jul. 4, 2012.
Healey, A., et al., "A Comparison of 25 Gbps NRZ & PAM-4 Modulation used in Legacy & Premium Backplane Channels", DesignCon 2012, 16 pages.
International Search Report for PCT/US2014/053563, dated Nov. 11, 2014, 2 pages.
Clayton, P., "Introduction to Electromagnetic Compatibility", Wiley-Interscience, 2006.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.
Skliar et al., A Method for the Analysis of Signals: the Square-Wave Method, Mar, 2008, Revista de Matematica: Teoria γ Aplicationes, pp. 09-129.
International Search Report and Written Opinion from PCT/US2014/034220 mailed Aug. 21, 2014.
International Search Report and Written Opinion for PCT/US14/052986 mailed Nov. 24, 2014.
Burr, "Spherical Codes for M-ARY Code Shift Keying", University of York, Apr. 2, 1989, pp. 67-72, United Kingdom.
Cheng, W., "Memory Bus Encoding for Low Power: A Tutorial", Quality Electronic Design, IEEE, International Symposium on Mar. 26-28, 2001, pp. 199-204, Piscataway, NJ.
Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/ tcomm.2003.822168, pp. 55-59.
Notification of Transmittal of International Search Report and The Written Opinion of the International Searching Authority, for PCT/US2015/018363, mailed Jun. 18, 2015, 13 pages.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_html.
Notification of Transmittal of the International Search Report and The Written Opinion of the International Searching Authority, or The Declaration for PCT/EP2013/002681, dated Feb. 25, 2014, 15 pages.
Ericson, T., et al., "Spherical Codes Generated by Binary Partitions of Symmetric Pointsets", IEEE Transactions on Information Theory, vol. 41, No. 1, Jan. 1995, pp. 107-129.
Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.
Schneider, J., et al., "ELEC301 Project: Building an Analog Computer," Dec. 19, 1999, 8 pages, http://www.clearrice.edu/elec301/Projects99/anIgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
"Introduction to: Analog Computers and the DSPACE System," Course Material ECE 5230 Spring 2008, Utah State University, www.coursehero.com, 12 pages.
Notification of Transmittal of the International Search Report and The Written Opinion of the International Searching Authority, or the Declaration, for PCT/US2014/015840, dated May 20, 2014. 11 pages.
Notification of Transmittal of the International Search Report and The Written Opinion of the International Searching Authority, or the Declaration, for PCT/US2014/043965, dated Oct. 22, 2014, 10 pages.
Notification of Transmittal of the International Search Report and The Written Opinion of the International Searching Authority, or The Declaration, dated Mar. 3, 2015, for PCT/US2014/066893, 9 pages.
International Preliminary Report on Patentability for PCT/US20141015840, dated Aug. 11, 2015, 7 pages.
Jiang, A., et al., "Rank Modulation for Flash Memories", IEEE Transactions of Information Theory, Jun. 2006, vol. 55, No. 6, pp. 2659-2673.
Zouhair Ben-Neticha et al, "The 'streTched'-Golay and other codes for high-SNR finite-delay quantization of the Gaussian source at 1/2 Bit per sample, IEEE Transactions on Communications, vol. 38, No. 12 Dec. 1, 1990, pp. 2089-2093, XP000203339, ISSN: 0090-6678, DOI: 10.1109/26.64647.
Oh, et al., Pseudo-Differential Vector Signaling for Noise Reduction in Single-Ended Signaling, DesignCon 2009.

(56) References Cited

OTHER PUBLICATIONS

Loh, M., et al., "A 3×9 Gb/s Shared, All-Digital CDR for High-Speed, High-Density I/O", Matthew Loh, IEEE Journal of Solid-State Circuits, vol. 47, No. 3, Mar. 2012.
Notification of Transmittal of the International Search Report and The Written Opinion of the International Searching Authority, or the Declaration, for PCT/US2015/039952, dated Sep. 23, 2015, 8 pages.
Notification of Transmittal of the International Search Report and The Written Opinion of the International Searching Authority, or the Declaration, for PCT/US2015/041161, dated Oct. 7, 2015, 8 pages.
Notification of Transmittal of the International Search Report and The Written Opinion of the International Searching Authority, or the Declaration, for PCT/US2015/043463, dated Oct. 16, 2015, 8 pages.
International Preliminary Report on Patentability for PCT/US20141034220, dated Oct. 20, 2015, 5 pages.

* cited by examiner

| $x$ | $i_0,i_1,i_2,i_3$ | $x$ | $i_0,i_1,i_2,i_3$ | $x$ | $i_0,i_1,i_2,i_3$ | $x$ | $i_0,i_1,i_2,i_3$ |
|---|---|---|---|---|---|---|---|
| 0 | 0,4,1,5 | 1 | 6,0,7,5 | 2 | 5,0,7,6 | 3 | 5,0,6,7 |
| 4 | 6,0,7,4 | 5 | 0,5,1,6 | 6 | 4,0,7,6 | 7 | 4,0,6,7 |
| 8 | 5,0,7,4 | 9 | 4,0,7,5 | 10 | 0,6,1,7 | 11 | 4,0,5,7 |
| 12 | 5,0,6,4 | 13 | 4,0,6,5 | 14 | 4,0,5,6 | 15 | 0,4,1,7 |
| 16 | 2,1,3,4 | 17 | 0,1,4,5 | 18 | 0,1,4,6 | 19 | 0,1,4,7 |
| 20 | 0,1,5,4 | 21 | 2,1,3,5 | 22 | 0,1,5,6 | 23 | 0,1,5,7 |
| 24 | 0,1,6,4 | 25 | 0,1,6,5 | 26 | 2,1,3,6 | 27 | 0,1,6,7 |
| 28 | 0,1,7,4 | 29 | 0,1,7,5 | 30 | 0,1,7,6 | 31 | 2,1,3,7 |
| 32 | 1,2,3,4 | 33 | 0,2,4,5 | 34 | 0,2,4,6 | 35 | 0,2,4,7 |
| 36 | 0,2,5,4 | 37 | 1,2,3,5 | 38 | 0,2,5,6 | 39 | 0,2,5,7 |
| 40 | 0,2,6,4 | 41 | 0,2,6,5 | 42 | 1,2,3,6 | 43 | 0,2,6,7 |
| 44 | 0,2,7,4 | 45 | 0,2,7,5 | 46 | 0,2,7,6 | 47 | 1,2,3,7 |
| 48 | 1,3,2,4 | 49 | 0,3,4,5 | 50 | 0,3,4,6 | 51 | 0,3,4,7 |
| 52 | 0,3,5,4 | 53 | 1,3,2,5 | 54 | 0,3,5,6 | 55 | 0,3,5,7 |
| 56 | 0,3,6,4 | 57 | 0,3,6,5 | 58 | 1,3,2,6 | 59 | 0,3,6,7 |
| 60 | 0,3,7,4 | 61 | 0,3,7,5 | 62 | 0,3,7,6 | 63 | 1,3,2,7 |
| 64 | 2,0,3,4 | 65 | 1,0,4,5 | 66 | 1,0,4,6 | 67 | 1,0,4,7 |
| 68 | 1,0,5,4 | 69 | 2,0,3,5 | 70 | 1,0,5,6 | 71 | 1,0,5,7 |
| 72 | 1,0,6,4 | 73 | 1,0,6,5 | 74 | 2,0,3,6 | 75 | 1,0,6,7 |
| 76 | 1,0,7,4 | 77 | 1,0,7,5 | 78 | 1,0,7,6 | 79 | 2,0,3,7 |
| 80 | 1,4,2,5 | 81 | 6,1,7,5 | 82 | 5,1,7,6 | 83 | 5,1,6,7 |
| 84 | 6,1,7,4 | 85 | 1,5,2,6 | 86 | 4,1,7,6 | 87 | 4,1,6,7 |
| 88 | 5,1,7,4 | 89 | 4,1,7,5 | 90 | 1,6,2,7 | 91 | 4,1,5,7 |
| 92 | 5,1,6,4 | 93 | 4,1,6,5 | 94 | 4,1,5,6 | 95 | 1,4,2,7 |
| 96 | 0,2,3,4 | 97 | 1,2,4,5 | 98 | 1,2,4,6 | 99 | 1,2,4,7 |
| 100 | 1,2,5,4 | 101 | 0,2,3,5 | 102 | 1,2,5,6 | 103 | 1,2,5,7 |
| 104 | 1,2,6,4 | 105 | 1,2,6,5 | 106 | 0,2,3,6 | 107 | 1,2,6,7 |
| 108 | 1,2,7,4 | 109 | 1,2,7,5 | 110 | 1,2,7,6 | 111 | 0,2,3,7 |
| 112 | 0,3,2,4 | 113 | 1,3,4,5 | 114 | 1,3,4,6 | 115 | 1,3,4,7 |
| 116 | 1,3,5,4 | 117 | 0,3,2,5 | 118 | 1,3,5,6 | 119 | 1,3,5,7 |
| 120 | 1,3,6,4 | 121 | 1,3,6,5 | 122 | 0,3,2,6 | 123 | 1,3,6,7 |
| 124 | 1,3,7,4 | 125 | 1,3,7,5 | 126 | 1,3,7,6 | 127 | 0,3,2,7 |
| 128 | 1,0,3,4 | 129 | 2,0,4,5 | 130 | 2,0,4,6 | 131 | 2,0,4,7 |
| 132 | 2,0,5,4 | 133 | 1,0,3,5 | 134 | 2,0,5,6 | 135 | 2,0,5,7 |
| 136 | 2,0,6,4 | 137 | 2,0,6,5 | 138 | 1,0,3,6 | 139 | 2,0,6,7 |
| 140 | 2,0,7,4 | 141 | 2,0,7,5 | 142 | 2,0,7,6 | 143 | 1,0,3,7 |
| 144 | 0,1,3,4 | 145 | 2,1,4,5 | 146 | 2,1,4,6 | 147 | 2,1,4,7 |
| 148 | 2,1,5,4 | 149 | 0,1,3,5 | 150 | 2,1,5,6 | 151 | 2,1,5,7 |
| 152 | 2,1,6,4 | 153 | 2,1,6,5 | 154 | 0,1,3,6 | 155 | 2,1,6,7 |
| 156 | 2,1,7,4 | 157 | 2,1,7,5 | 158 | 2,1,7,6 | 159 | 0,1,3,7 |
| 160 | 2,4,3,5 | 161 | 6,2,7,5 | 162 | 5,2,7,6 | 163 | 5,2,6,7 |
| 164 | 6,2,7,4 | 165 | 2,5,3,6 | 166 | 4,2,7,6 | 167 | 4,2,6,7 |
| 168 | 5,2,7,4 | 169 | 4,2,7,5 | 170 | 2,6,3,7 | 171 | 4,2,5,7 |
| 172 | 5,2,6,4 | 173 | 4,2,6,5 | 174 | 4,2,5,6 | 175 | 2,4,3,7 |
| 176 | 0,3,1,4 | 177 | 2,3,4,5 | 178 | 2,3,4,6 | 179 | 2,3,4,7 |
| 180 | 2,3,5,4 | 181 | 0,3,1,5 | 182 | 2,3,5,6 | 183 | 2,3,5,7 |
| 184 | 2,3,6,4 | 185 | 2,3,6,5 | 186 | 0,3,1,6 | 187 | 2,3,6,7 |
| 188 | 2,3,7,4 | 189 | 2,3,7,5 | 190 | 2,3,7,6 | 191 | 0,3,1,7 |
| 192 | 1,0,2,4 | 193 | 3,0,4,5 | 194 | 3,0,4,6 | 195 | 3,0,4,7 |
| 196 | 3,0,5,4 | 197 | 1,0,2,5 | 198 | 3,0,5,6 | 199 | 3,0,5,7 |
| 200 | 3,0,6,4 | 201 | 3,0,6,5 | 202 | 1,0,2,6 | 203 | 3,0,6,7 |
| 204 | 3,0,7,4 | 205 | 3,0,7,5 | 206 | 3,0,7,6 | 207 | 1,0,2,7 |
| 208 | 0,1,2,4 | 209 | 3,1,4,5 | 210 | 3,1,4,6 | 211 | 3,1,4,7 |
| 212 | 3,1,5,1 | 213 | 0,1,2,5 | 214 | 3,1,5,6 | 215 | 3,1,5,7 |
| 216 | 3,1,6,4 | 217 | 3,1,6,5 | 218 | 0,1,2,6 | 219 | 3,1,6,7 |
| 220 | 3,1,7,4 | 221 | 3,1,7,5 | 222 | 3,1,7,6 | 223 | 0,1,2,7 |
| 224 | 0,2,1,4 | 225 | 3,2,4,5 | 226 | 3,2,4,6 | 227 | 3,2,4,7 |
| 228 | 3,2,5,4 | 229 | 0,2,1,5 | 230 | 3,2,5,6 | 231 | 3,2,5,7 |
| 232 | 3,2,6,4 | 233 | 3,2,6,5 | 234 | 0,2,1,6 | 235 | 3,2,6,7 |
| 236 | 3,2,7,4 | 237 | 3,2,7,5 | 238 | 3,2,7,6 | 239 | 0,2,1,7 |
| 240 | 0,4,3,5 | 241 | 6,3,7,5 | 242 | 5,3,7,6 | 243 | 5,3,6,7 |
| 244 | 6,3,7,4 | 245 | 0,5,3,6 | 246 | 4,3,7,6 | 247 | 4,3,6,7 |
| 248 | 5,3,7,4 | 249 | 4,3,7,5 | 250 | 0,6,3,7 | 251 | 4,3,5,7 |
| 252 | 5,3,6,4 | 253 | 4,3,6,5 | 254 | 4,3,5,6 | 255 | 0,4,3,7 |

Figure 10

METHODS AND SYSTEMS FOR LOW-POWER AND PIN-EFFICIENT COMMUNICATIONS WITH SUPERPOSITION SIGNALING CODES

CROSS-REFERENCES TO RELATED APPLICATIONS

The following references are herein incorporated by reference in their entirety for all purposes:

U.S. patent application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/030,027, filed Feb. 17, 2011, naming Harm Cronie, Amin Shokrollahi and Armin Tajalli entitled "Methods and Systems for Noise Resilient, Pin-Efficient and Low Power Communications with Sparse Signaling Codes" (hereinafter "Cronie III").

REFERENCES

[Poulton] U.S. Pat. No. 6,556,628 B1 to John W. Poulton, Stephen G. Tell and Robert E. Palmer, entitled "Methods and Systems for Transmitting and Receiving Differential Signals over a Plurality of Conductors".

[Chiarulli] U.S. Pat. No. 7,358,869 to Donald M. Chiarulli and Steven P. Levitan, entitled "Power Efficient, High Bandwidth Communication using Multi-Signal-Differential Channels".

[Slepian] D. Slepian, "Permutation Modulation," published in the proceedings of the IEEE, Vol. 53, No. 3, March 1965, pages 228-236.

[Horowitz] U.S. Pat. No. 7,142,612 B2 to Mark A. Horowitz, Scott C. Best and William F. Stonecypher, entitled "Method and Apparatus for Multi-Level Signaling".

FIELD OF THE INVENTION

The present invention relates to communications in general and in particular to transmission of signals capable of conveying information, wherein power consumption, pin-efficiency, SSO noise and common-mode noise are constraints.

BACKGROUND OF THE INVENTION

In communication systems, the goal is to transport information from one physical location to another. It is preferred that the transport of this information is reliable, is fast and consumes a minimal amount of resources. In most cases, there are trade-offs that need to be dealt with. For example, error-free communications might be possible if there were no bandwidth, latency or power-consumption constraints on a communication channel and system, but in most applications there are some constraints that require some design for robustness. Each of these constraints can be measured and designed for.

For example, bandwidth is often measured in the number of bits representing the information being conveyed per unit time. Sometimes, information is conveyed in non-binary form, but that can typically be considered as binary data anyway. For example, if information is represented by a sequence of symbols selected from a symbol alphabet of four symbols, each symbol can represent conveyance of two bits. With symbol alphabets having a size that is not a power of two, fractional bits are involved or rounding is involved, as is well-known in the field of information theory. It is also known that some number of bits or symbols might have different information content and that bits or symbols with low information content, where the excess is often considered a redundancy that can be compressed out, used for error detection or correction, or for other uses. In some designs, bandwidth is measured by bits/second or symbols/second of non-redundant information conveyed or encoded information conveyed (possibly having some redundancy as required for error handling or other signaling).

Latency is often measured by the time delay between a sender having information (in the form of data, a message, signals, etc.) ready to send to a receiver over a channel and the time when the receiver can use that information. For example, for a channel between two chips, if there are eight wires and eight independent bits are conveyed at a time, the latency might be just the time of flight (signal speed times length of wire) plus the time needed to charge and discharge transistors or other circuit elements in the path. However, where some computation is needed to encode and decode the information, the time needed for that computation is added to the latency.

Power-consumption is often expressed as a function of the number of operations (logical, computing, etc.) that are needed per unit bits to communicate them. For example, a design where six logical operations are needed to convey eight bits of information, that might be considered twice as expensive, power-consumption wise, as a design where three logical operations are needed to convey eight bits of information. Often, what is important in a design is the average effort, as that more often reflects on the total power consumption, heat dissipation, etc. as compared with the minimum and maximum values. It is known that with a fast processor and proper coding, many operations per second can be performed with arbitrary complexity. For example, a conventional packet router often has a processor or a specialized chip that reads instructions from an instruction memory and performs the instructed operation. In such cases, the power-consumption measurement has to fairly include the power consumption of the processor, the instruction memory, etc., albeit amortized over the number of bits conveyed.

As is well-known, a processor and memory can perform arbitrarily complex operations (e.g., table lookups, Fast Fourier transformations, multiplications, arbitrary finite algebra, etc.) that cannot be performed by two or three logic gates, but some designs are so power-consumption and latency limited that the design only allows for a few logic gates. For example, if the communication channel is between two parts of a chip or between two chips, it might not be practical to insert a processor and instruction memory between those two parts, consuming chip or board real estate as well as power, in order to effect some particular communications scheme. As an example, network communications between two microwave relay stations might be made reliable by using transmission powers of multiple watts, multiple levels of convolutional coding, handshaking for acknowledgements and retransmission of lost packets, and the like, where the power needed to perform the computations is largely irrelevant relative to the power needed to send the signal over the medium, but none of that would be practical for communications between two chips on a circuit board or between two circuits on a chip where the power needed to perform any needed computational, circuit or logical operations would be much larger than what is needed to actual convey the signals.

Another consideration in a design is signal noise. To send more robust signals, the amplitude of the signals can be increased, but that might lead to increased noise in other parts of the channel or system, in addition to increased power consumption. Thus, all other things being equal, the system that uses lower amplitude signals might be preferred.

In many electronic devices, communication plays an important role regardless of the function these electronic devices fulfill. Most modern electronic devices contain integrated circuits ("IC") that exchange information with one another. The information may also be exchanged between ICs connecting two different devices. In general, one refers to these two communication settings as chip-to-chip communication.

In chip-to-chip communication, the physical transfer of information takes place over a transmission medium that may use multiple transmission paths. Each of these transmission paths is able carry a signal measurable by some physical characteristic or quantity, such as an electric voltage signal, electric current signal, light intensity signal or other electromagnetic field strength measurable on a wire, fiber or other medium. Herein, for readability, such paths/media for transmission is referred to as a "wire" without intending to limit wires to specific examples and the physically measurable characteristic, quantity or phenomenon is referred to as a "signal" on that wire. While distinct wires may carry distinct signals, it is often the case that signals on one wire will induce undesirable signals on another wire, either by signal-to-signal noise, common mode noise or other known phenomenon.

Depending on the exact application, a wire may be a microstrip on a printed circuit board ("PCB"), a metal wire integrated on an IC and connecting two components within the same chip and/or a bond wire connecting two chips that are mounted on top of each other in a package-on-package configuration. As used herein, "wire" can refer to any physical path between one IC to another that can carry a signal on that wire. This physical path may comprise several parts, such as a metal trace on a PCB, a bond wire, a coupling capacitor, a "through silicon via" ("TSV") and a connector. It is to be understood that these parts may be included in the concept of a wire. Multiple wires may be used to communicate and multiple wires in parallel constitute a communications bus. Important parameters in chip-to-chip communications are the communication speed, the power consumption, the physical footprint of the communication bus and electronics, and the error performance. In most chip-to-chip communication systems, the error performance has to be very low (e.g., less than one error in $10^{12}$ bits) and a certain amount of energy is required to achieve the error performance.

The pin-efficiency, r, of a chip-to-chip communication system is defined as the number of bits transmitted per wire in each communication interval. The communication interval, T, is often small and may be in the order of, e.g., $10^{-10}$ seconds or less. Multiple wires may be used to achieve a required aggregate data rate. A high pin-efficiency is preferred over a low pin-efficiency since the former allows one to have a smaller physical footprint for the same total data rate. Furthermore, if one is able to increase the pin-efficiency, the frequency of communication may be lowered to achieve the target aggregate data rate which immediately leads to lower power consumption in most chip-to-chip communication systems.

There are several reasons why it is difficult to design high speed, low power, small footprint and low error-rate chip-to-chip communication systems. First, communication is not perfect and the signals transmitted on the wires are disturbed by noise and interference. In chip-to-chip communications some sources of noise are thermal noise, common-mode noise and interference, crosstalk, reference noise and switching noise. An important type of switching noise is simultaneous switching output ("SSO") noise. SSO noise plays a large role at higher communication frequencies. The resilience against some of these noise types may be increased by increasing the transmit power. For others, such as SSO noise and crosstalk, increasing the transmit power is not beneficial since these noise types tend to increase as well.

A second impairment of chip-to-chip communications is that the physical medium tends to attenuate the signals transmitted on the wires. Especially when the data rate increases and/or the wires become longer, attenuation will increase. This requires one to increase transmission power burned in the drivers and use equalization methods. Since a large part of the power consumption consists of the power burned in the drivers the total power consumption has to increase to combat the attenuation.

To combat the issues with respect to common-mode noise, crosstalk, and SSO noise many chip-to-chip communication systems use differential signaling. In differential signaling an information carrying signal is encoded into the difference of two signals. Each of these encoded signals is transmitted on a separate wire. Differential signaling provides immunity against common-mode noise and interference and one can use a transmitter architecture that minimizes SSO noise. A major downside of differential signaling is that the pin-efficiency is only r=0.5. To achieve high data rates one would have to run at very high frequencies where attenuation is high. One would like to use signaling methods for chip-to-chip communications that preserve the excellent properties of differential signaling but operate at a significantly higher pin-efficiency. Furthermore, these methods should allow for an efficient implementation in terms of circuitry and lead to a power-efficient operation.

Some systems have been devised to deal with the constraints explained above, including some previously developed by the inventors named in the present application.

FIG. 1 illustrates generally a conventional chip-to-chip communication system that uses differential signaling. The system is shown comprising a transmit unit 100 connected by a communication bus 120 to a receive unit 150. Transmit unit 100 comprises a driver unit 110 that drives two wires 122 of bus 120. Driver unit 110 generates two signals 112 and 114, denoted in the figure by $s_0$ and $s_1$, based on the information to be transmitted on bus 120. Driver 110 may drive the wires of bus 120 in voltage-mode or current-mode. Bus 120 may be terminated at the receiver by a termination resistor 130 and at the transmitter by a termination resistor 132. A differential amplifier or comparator 140 measures the voltage across termination resistor 130 and detects the data transmitted on bus 120.

For differential signaling, these two signals satisfy $s_0=-s_1$ and this property gives differential signaling its excellent properties with respect to common-mode noise and crosstalk. Driver 110 may perform additional tasks, such as amplification, pre-emphasis and equalization. Differential amplifier 140 may perform additional tasks, such as de-emphasis, equalization and equalization. By "perform tasks", it should be understood that performance can be implemented using particular circuitry and/or physically-implemented logical elements.

FIG. 1 also shows that transmit unit 100 is connected to a positive terminal 160 of a power supply (not shown) and a ground terminal 162. Terminals 150 and 162 supply transmit unit 100 with a voltage of Vdd volts. The circuitry of transmit unit 100 requires a power supply to operate. A parasitic inductor 164 impairs the connection to Vdd, while a parasitic inductor 166 impairs the connection to ground terminal 162. Parasitic inductors 164, 166 might be a result of, e.g., a bondwire and/or impedance discontinuity in an IC package, as is known. When circuitry in transmit unit 100 causes variations in currents through parasitic inductors 164, 166, a voltage develops across those parasitic inductors, which causes a drop in power supply voltage for circuitry in transmit unit 100 and this may cause the signals transmitted on bus 120 to be disturbed. The time-varying current through parasitic inductors 164, 166 is largely determined by the signaling method. For binary differential signaling, the variation is minimal, since $s_0 = -s_1$.

FIG. 2 illustrates the use differential signaling with multiple wires, on a chip-to-chip communication system. FIG. 2 shows a chip-to-chip communication system where communication takes place over a bus 220 comprising 2n wires 235 between a transmit unit 200 and a receive unit 250. Transmit unit 200 comprises n drivers 260 that each implement differential signaling of an input signal (not shown). Each of these drivers 260 is connected to a different pair of wires of communication bus 220. The wires 235 of communication bus 220 can be terminated at transmit unit 200 and/or receive unit 250. At receive unit 250, differential receivers or comparators 270 sense the signals on each pair of wires. Drivers 260 in transmit unit 200 are connected to a positive power supply 280 and a ground 282. Both connections are through parasitic inductors 284 and 286, respectively. Since differential transmitters are used, the variation of the currents through parasitic inductors 284 and 286 may be small. The reason for this is clear when binary differential signaling is used and the bus is driven in current-mode. In that instance, each of drivers 260 sources a current of some strength I into one of the wires of the wire pair and sinks a current of that strength I from the other wire of the wire pair. The sum of all currents that is sourced by drivers 260 is supplied though parasitic inductor 284 and is constant. The sum of all currents that is sunk by drivers 260 is sunk into ground 282 through parasitic inductor 286 and is constant as well. Hence the introduction of SSO is minimized. One may require multiple connections to Vdd and ground to limit the current through each of these connections. SSO is also minimized, as should be apparent.

A major drawback of using binary differential signaling is that the pin-efficiency, r, is only r=0.5. To achieve a bitrate of $f_b$ bits per wire, the symbol rate or frequency of operation per wire has to be $2f_b$. For high-speed operation and/or for longer transmission paths, the amount of power spent in the drivers has to increase substantially to mitigate the effects of attenuation. To achieve a higher pin-efficiency with differential signaling, one can opt for multi-level differential signaling. Although this leads to higher pin-efficiencies, the required transmission power to assure reliable communication may increase faster than the advantages obtained from a potentially lower symbol rate.

In [Poulton], a multi-wire differential signaling scheme was proposed that indicated a potential to obtain higher pin-efficiencies than differential signaling. The scheme disclosed in [Poulton] retains several of the noise resilience properties of differential signaling, but creates other problems.

[Poulton] only teaches how to implement pin-efficient schemes for three and four wires, but often transmission takes place over a bus of more than four wires. Also, as pointed out in [Poulton], the method disclosed there is not very power-efficient. A signaling method that achieves high pin-efficiency and is power efficient is therefore preferred. Finally, encoding and decoding the signaling method as disclosed in [Poulton] is not straightforward, especially when the number of wires is more than four and therefore much power might be consumed in just the processing and handling of signaling.

[Horowitz] describes a signaling method that reduces SSO. The method in [Horowitz] is based on multi-level signaling where the sum of the signal levels transmitted on the bus is kept close to each other from bus cycle to bus cycle. There are several problems to this approach. First, for the method to have maximum effect, all driver circuitry has to use a single connection to Vdd and a single connection to ground. This is only possible for a small number of bus wires such that the total required current can be limited. Second, encoding and decoding such signaling schemes is only possible for a small number of bus wires to avoid overly complex encoding and decoding. Third, introducing memory between consecutive bus cycles increases the delay of the bus communication system.

In Cronie I, orthogonal differential vector signaling ("ODVS") is described. ODVS allows for chip-to-chip communications with a pin-efficiency larger than that of differential signaling (up to r=1.0) with a resilience against several types of noise similar to that of differential signaling. Where even larger pin-efficiencies are needed, the teachings of Cronie II and Cronie III can be applied.

Cronie II and Cronie III teach that spherical codes can be used to obtain pin-efficiencies larger than r=1.0. In some embodiments, these spherical codes are permutation modulation codes (as in Cronie II) or sparse signaling codes (as in Cronie III). These codes lead to pin-efficient and noise resilient chip-to-chip communications, while keeping the power consumption of transmitter and receiver low compared to conventional signaling methods. In certain cases, encoding the signaling schemes of Cronie III for pin-efficiencies larger than r=1.0 can be simplified. Furthermore, for high pin-efficiencies and some of the signaling schemes of Cronie III, hardware architectures that effectively mitigate SSO noise can also be simplified.

Yet some application might still require more power-efficient signaling methods that provide a pin-efficiency larger than r=0.5 and provide SSO resilience with an efficient hardware architecture, with a good performance with respect to common-mode noise and interference.

BRIEF SUMMARY

Embodiments of the present invention provide for processes and apparatus for transmitting data over physical channels such that the signals transmitted are resilient to common mode noise, do not require a common reference at the transmission and reception points, involve a pin-efficiency that is greater than 100%, with relatively low power dissipation for encoding and decoding. Corresponding decoders at reception points are also disclosed.

In a particular embodiment, information is transmitted over a communication bus by receiving a first set of signals representing the information, mapping the first set of signals to a second set of signals, wherein the second set of signals comprises one or more codeword selected from among the valid codewords of a superposition code, and providing the second set of signals for transmission over the communication bus. A corresponding decoder decodes the second set of signals (possibly altered by the communication bus) in an attempt to recover a replication of the first set of signals while reducing the amount of energy needed to do so.

In some embodiments, a transmit unit receives a number of bits of information to be conveyed to a receive unit and receives that number of bits in each of a plurality of time periods such that the receive unit can recover (at least approximately) that number of bits in each of the time periods (possibly with some latency). The transmit unit considers those number of bits, splits them into two or more input bit vectors, maps each of the two or more input bit vectors onto an element of a signal constellation associated with each input bit vector and the combined, to form a plurality of signals for a plurality of wires of a bus between the transmit unit and the receive unit. In particular, the transmit unit might receive k bits in a period, split those k bits into l parts (l being greater than one) and, for each part, apply the part to a permutation modulation basis vector for that part, thus forming l permutation vectors, that are combined to form a set of signals output, for that period, on the wires of the bus, where the number of wires, n, on the bus is equal to k/l when all of the l parts are of the same size. The use of a plurality of permutation vectors and their combination forms a "superposition signaling code" scheme.

An encoder (and corresponding decoder) can be defined by k, l, n, the particular permutation modulation ("PM") basis vectors used, and possibly also the combination technique used. Thus, codewords from the superposition signaling code can be represented by vectors, with each vector comprising a plurality of vector components, wherein codewords are characterized as being combinations of some number, l (with l>1), of secondary codewords using a superpositioning operator. Each of the secondary codewords is representable by vectors belonging to some predetermined set of secondary codewords.

In some embodiments, the superpositioning operator adds the components of these l secondary codewords to obtain a superpositioning codeword that is to be sent over the communications channel. The number of secondary codewords, l, is herein referred to as the number of "layers" of the superposition code. In some embodiments, the secondary codewords may be obtained by different permutations of one or more basis vectors, giving rise to a set of secondary codewords that forms a permutation modulation code.

In some embodiments, the secondary codewords may have quiescent vector components and nonquiescent vector components, and the set of all possible secondary codewords can be from one sparse signaling code or from a union of several sparse signaling codes, wherein a sparse signaling code comprises vectors for which the number of quiescent vector components and nonquiescent vector components meets some sparseness requirement. One such sparseness requirement might be that a ratio of quiescent vector components to total vector components is greater than or equal to one-third. However, other sparseness requirements might be used instead. In specific examples, a quiescent vector component is represented by a value of zero, a zero voltage and/or a zero current, but the sparse code need not be limited to such examples. In general, a quiescent vector component is a vector component that does not lead to physical power transfer from one end to another end of a bus wire, or at least substantially less physical power transfer as compared with the physical power transfer caused by a nonquiescent vector component. The quiescent vector component is typically referred to herein as the "zero" symbol.

In some embodiments, different voltage, current, etc. levels are used for signaling and more than two levels might be used, such as a ternary sparse signaling code wherein each wire signal has one of three values. In some embodiments, there are no more than two nonquiescent vector components for each codeword vector and in some embodiments, at least half of the vector components of each codeword vector are quiescent vector components.

Hardware elements might include storage for symbols of input information used for selecting codewords, processing hardware to convert symbols to signals, parsing symbols into separate partitions, storing results, and providing the partitions in sequence as signals.

Various embodiments of the invention are given with reference to specific hardware implementations of small area and low power dissipation. The following detailed description together with the accompanying drawings will provide a better understanding of the nature and advantages of the present invention.

BRIEF DESCRIPTION OF THE DRAWINGS

FIG. 10 is a mapping of bits to encodings, resulting from the process of FIG. 9.

DETAILED DESCRIPTION OF EMBODIMENTS

Figure 1:
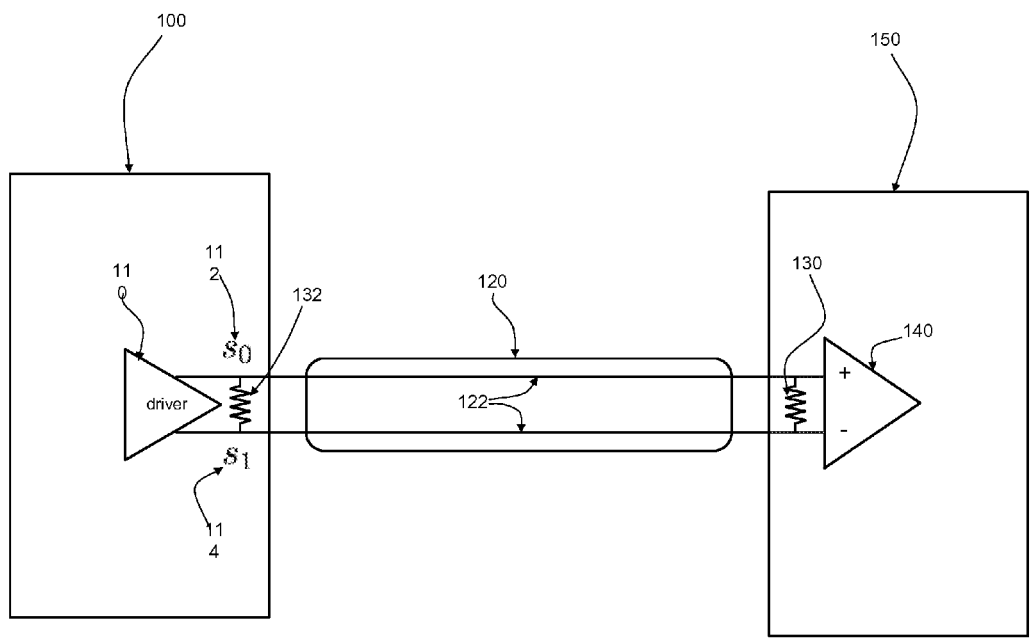
FIG. 1 illustrates generally a conventional chip-to-chip communication system that uses differential signaling.
Figure 2:
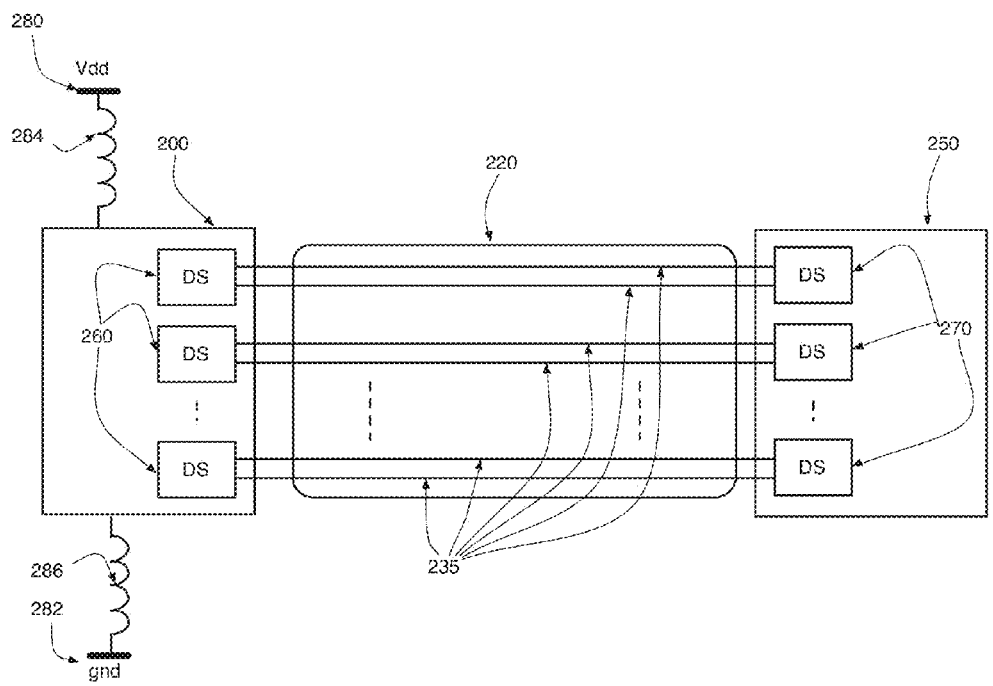
FIG. 2 illustrates the conventional use differential signaling with multiple wires, on a chip-to-chip communication system.
Figure 3:
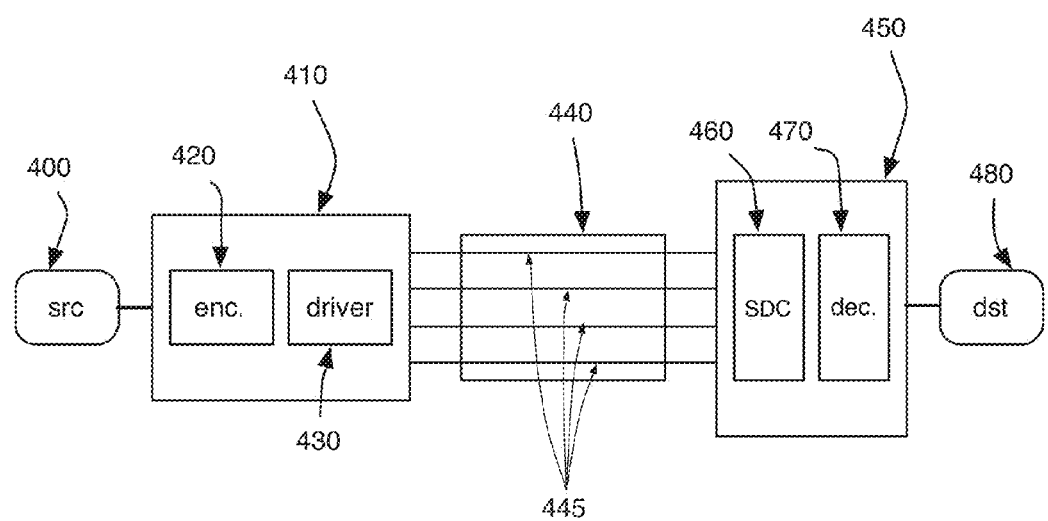
FIG. 3 illustrates an overview of a chip-to-chip communication system that might use elements of the present invention.

FIG. 3 illustrates an overview of a chip-to-chip communication system that might use elements of the present invention. It should be understood that the descriptions here are not meant to be limiting and one of ordinary skill in the art should understand, after reading this disclosure with the accompanying figures, that other variations are possible. As illustrated in FIG. 3, a source of information (or data) typically represented or representable by bits to be conveyed in each of a plurality of time periods, illustrated as source 400, provides k bits to a destination 480 per communication period, T, where source 400 and destination 480 might be chips or circuits that use the transmitted data in some fashion. The information flow is generally from source 400 to a transmit unit 410, to a bus 440, to a receive unit 450 and from there to destination 480. Preferably, the overall transmit rate, overall power consumption of elements per communication period, and the error rate are all within design constraints for the particular application, and do so with other constraints, such as a pin-efficiency constraint.

Communication bus 440 comprises n wires 445. Without loss of generality, one may assume that the information in the source 400 is available as a sequence of k bits. Furthermore, one may assume that in each communication period (time interval) of T seconds, the next sequence of k bits is available.

Transmit unit 410 may have two main tasks. First, the information may be encoded by an encoder 420 such that the original information from source 400 is protected with respect to several noise types that are present in chip-to-chip communications. Second, the transmit unit 410 may comprise a driver 430 that drives wires 445 of bus 440 based on the encoded data from encoder 420. At the other end of communication bus 440, receive unit 450 senses the signals at the output of communication bus 440 and attempts to recover the information that was transmitted by transmit unit 410. For this purpose, receive unit 450 may comprise a signal-to-digital converter ("SDC") 460 and a decoder 470. SDC 460 senses the signals on bus 440 and may generate a discrete representation of the signals on bus 440. This representation is forwarded to decoder 470, which recovers the original information sent by source 400 and forwards the result to destination 480.

In a preferred embodiment, the transmit unit 410 generates a sequence of signals for the n wires of the bus. The signals are determined for each communication period based on the k bits to be sent, generally, as indicated by Equation 1, wherein the sequence of signals over a given communications period are represented by the set of signals $s_0(t), \ldots, s_{n-1}(t)$, where z represents an encoding of the k bits and p(t) represents a pulse shape (as a function of time).

$$\text{Signal Set} = \begin{bmatrix} s_0(t) \\ \vdots \\ s_{n-1}(t) \end{bmatrix} = zp(t) \quad \text{(Eqn. 1)}$$

In Equation 1, z is representable as a vector of size n and p(t) is a time-dependent scalar predetermined pulse shape. Each communications period corresponds to a time interval over which p(t) is defined and in which a new sequence of k bits may be available from source 400, from which encoder 420 may generate a new vector z based on those k bits.

Figure 4:
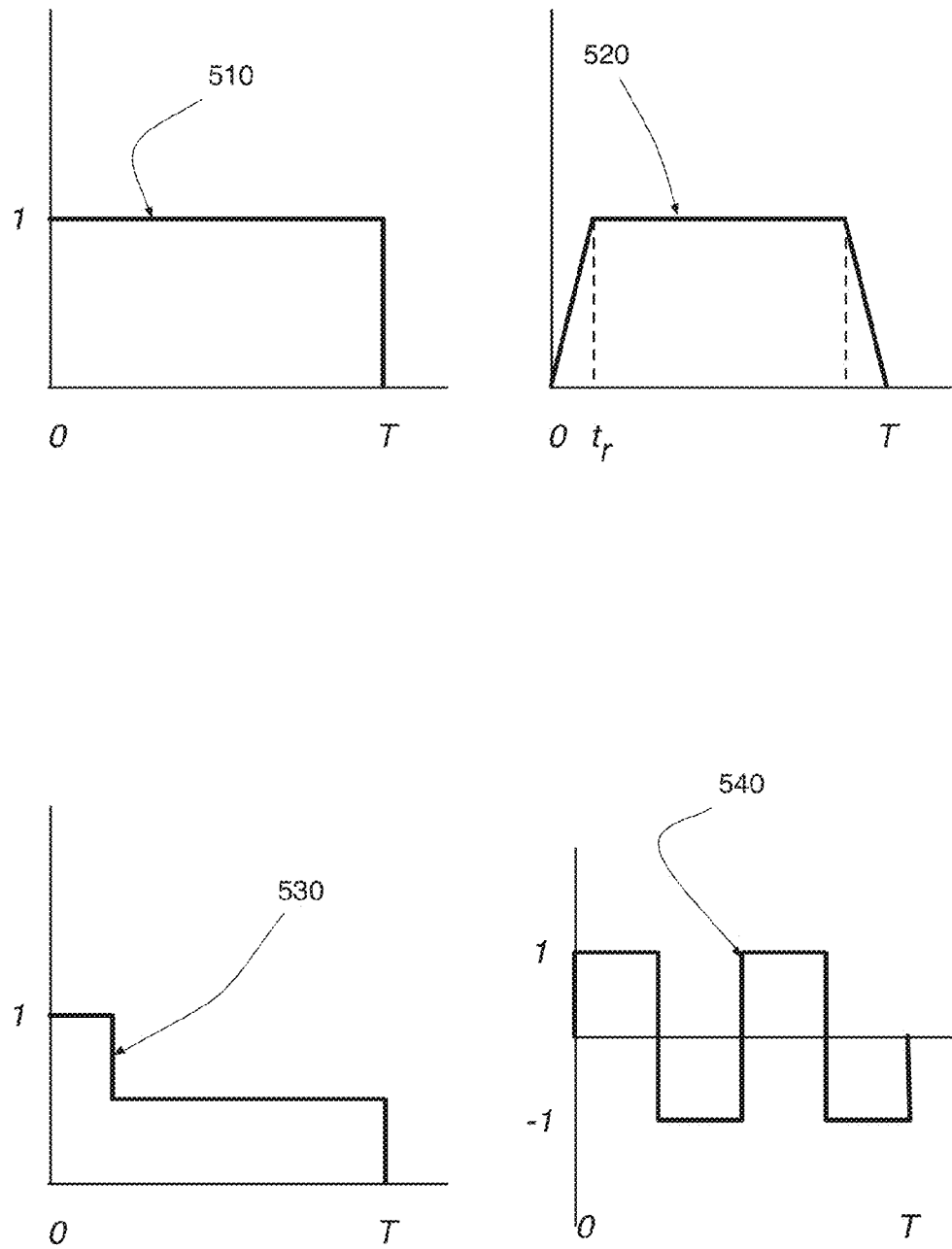
FIG. 4 illustrates various examples for pulse shapes.

FIG. 4 illustrates various examples for pulse shapes, p(t). The pulse shape might be chosen according to the application. FIG. 4(a) shows a square pulse shape 510; FIG. 4(b) shows a pulse shape 520 with a finite rise and fall time $t_r$; FIG. 4(c) shows a pulse shape 530 that includes pre-emphasis; and FIG. 4(d) shows a periodic square pulse shape 540. Pulse shape 520 may show improved crosstalk performance compared to pulse shape 510. Pulse shape 530 may be used to combat high frequency losses. Other pulse shapes might be used instead, as might be known to one of ordinary skill in the art.

The set of all vectors z is referred to herein as "the signal constellation" S of the code. The choice of S affects performs of a chip-to-chip communication system, since S determines (at least in part) the system's resilience against noise, the pin-efficiency of the system and the power consumption of the system. The k information bits have to be mapped to the elements of S (in order that they may be uniquely recovered from the set of signals sent) and this may lead to additional complexity in terms of hardware. The choice of S has consequences for the required complexity. Ways to choose S such that one achieves a resilience against common-mode noise, a high pin-efficiency and a low power consumption while keeping the additional hardware complexity low are explained herein.

Figure 5:
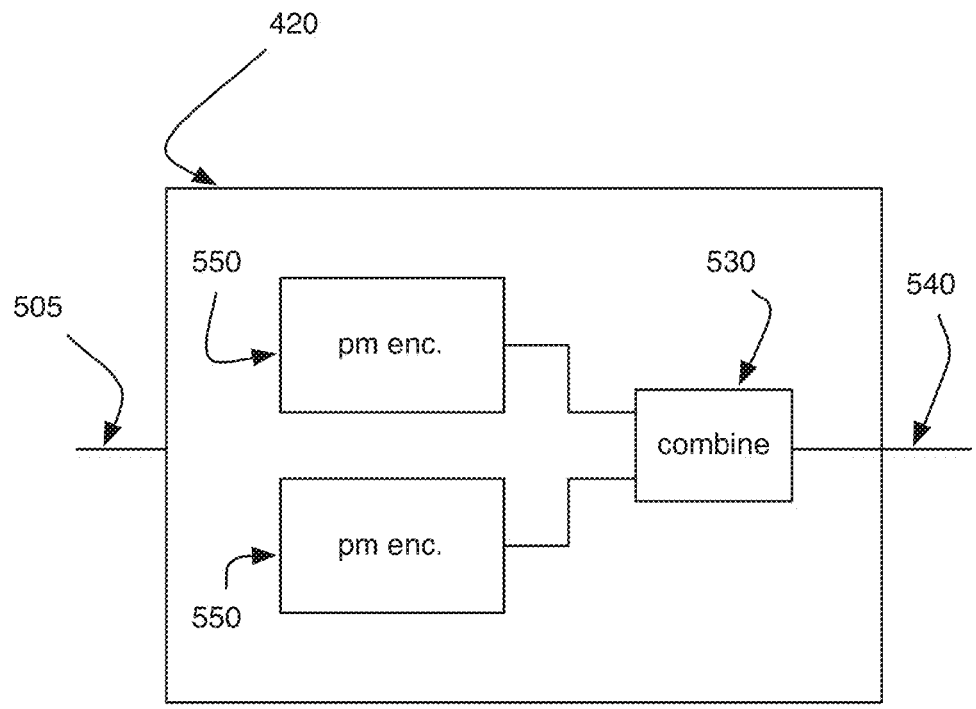
FIG. 5 illustrates an embodiment of the encoder of FIG. 3 in greater detail.

FIG. 5 illustrates an embodiment of encoder 420 of FIG. 3 in greater detail. Encoder 420 is shown comprising a plurality of permutation modulation encoders 550 that each encodes a permutation modulation code. Permutation modulation codes are a type of spherical codes. [Slepian] describes permutation modulation codes. Specific instances of spherical codes and permutation modulation codes have useful properties for chip-to-chip communications as shown in Cronie II and Cronie III. In Cronie III, it is shown, for example, that with a type of permutation modulation codes referred to therein as sparse signaling codes, the power consumption of a chip-to-chip communication system may be substantially reduced.

The input 505 to encoder 420 (each period) is a sequence of k bits from source 400 (not shown). This sequence of k bits is split into l parts, where l is at least two, but can be three, four, or more than four. The first part comprises $k_0$ bits and is forwarded to a first permutation modulation encoder 550(0). The second part comprises $k_1$ bits and is forwarded to a second permutation modulation encoder 550(1), and so on up to the l-th part comprising $k_{l-1}$ bits forwarded to an l-th permutation modulation encoder 550(l−1). For the purpose of this explanation, it is assumed that at least one of $k_0$ to $k_{l-1}$ is greater than 1. Note that $k=k_0+k_1+\ldots+k_{l-1}$.

Superposition Signaling Encoding for l=2

The following example is for the two-layer encoder, i.e., where l=2. Extensions to more than two layers are explained later. Where l=2, $k=k_0+k_1$ and there are two permutation modulation encoders. The first permutation modulation encoder, 550(0), is defined by a basis vector, $x_0$, that is of dimension $N_0$. In a preferred embodiment, the vector $x_0$ has a form wherein there are t subsequences of vector components each having a constant value of some real number in decreasing order, as shown by Equation 2.

$$x_0 = (\underbrace{a_0, \ldots, a_0}_{n_0} | \underbrace{a_1, \ldots, a_1}_{n_1} | \ldots | \underbrace{a_t, \ldots, a_t}_{n_t}) \quad \text{(Eqn. 2)}$$

In Equation 2, $n_0, n_1, \ldots, n_t$ are positive integers summing up to $N_0$, the vector components $a_0, a_1, \ldots, a_t$ are real numbers such that $n_0a_0+n_1a_1+ \ldots +n_ta_t=0$ and $a_0>a_1> \ldots >a_t$. The permutation modulation code defined by $x_0$ is defined as the set of all permutations of $x_0$. The elements of the permutation modulation code generated by $x_0$ can be enumerated by the different partitions of the set $\{1, 2, \ldots, N_0\}$ into subsets of sizes $n_0, n_1, \ldots, n_t$. Let $S_0$ denote the signal constellation defined by the set of all permutations of $x_0$. The size of $S_0$ is as shown in Equation 3. If $|S_0| \geq 2^{k_0}$, then $k_0$ bits can be uniquely mapped to $2^{k_0}$ different elements of $S_0$.

$$|S_0| = \frac{N_0!}{n_0!n_1!\ldots n_t!}. \quad \text{(Eqn. 3)}$$

Similarly, permutation modulation encoder 550(1) is defined by a basis vector $x_1$ that is of dimension $N_1$. In a preferred embodiment, the vector $x_1$ has a similar form, as shown by Equation 4.

$$x_1 = (\underbrace{b_0, \ldots, b_0}_{m_0} | \underbrace{b_1, \ldots, b_1}_{m_1} | \ldots | \underbrace{b_u, \ldots, b_u}_{m_u}) \quad \text{(Eqn. 4)}$$

In Equation 4, $m_0, m_1, \ldots, m_u$ are positive integers summing up to $N_1$, the vector components $b_0, b_1, \ldots, b_u$, are real numbers such that $m_0b_0+m_1b_1+ \ldots +m_ub_u=0$ and $b_0>b_1> \ldots >b_u$. The permutation modulation code defined by $x_1$ is defined as the set of all permutations of $x_1$. The elements of the permutation modulation code generated by $x_1$ can be enumerated by the different partitions of the set $\{1,2,\ldots,N_1\}$ into subsets of sizes $m_0, m_1, \ldots, m_u$. Let $s_1$ denote the signal constellation defined by the set of all permutations of $x_1$. The size of $s_1$ is as shown in Equation 5. If $|S_1| \geq 2^{k_1}$, then $k_1$ bits can be uniquely mapped to $2^{k_1}$ different elements of $s_1$.

$$|S_0| = \frac{N_0!}{m_0!m_1!\ldots m_u!} \quad \text{(Eqn. 5)}$$

In a preferred embodiment, the sizes of $x_0$ and $x_1$ are equal, so $N_0=N_1$. However, in some cases, it may be preferred to use basis vectors that define permutation modulation codes that are not equal in size. The length, n, of a superposition signaling code is defined as the maximum length of any of the basis vectors in the collection of basis vectors used. As an example, consider the following basis vector $x=[1\ 0\ 0\ 0\ -1]$ of dimension 5 that may be used by permutation modulation ("PM") encoders 550(0) and 550(1). There are 20 distinct permutations of x, which allows for any sequence of four bits to be encoded into a unique permutation of x.

In the encoder, the k bits are split by a splitter 510 into the $k_0, \ldots, k_{l-1}$ parts that are provided to the l PM encoders 550. Where l=2, splitter 510 provides two parts to PM encoders 550(0) and 550(1) and the permutations of $x_0$ and $x_1$ as generated by permutation modulation ("PM") encoders 550(0) and 550(1) are denoted by $P_0(x_0)$ and $P_1(x_1)$, respectively. The vectors $P_0(x_0)$ and $P_1(x_1)$ are provided to a combine unit 530. In some embodiments, splitter 510 and combine unit 530 comprise actual circuitry, whereas in other embodiments one or both are effected by particular wire connections and/or routing.

In a preferred embodiment, combine unit 530 generates an encoded vector, z, as a superposition, as indicated in Equation 6.

$$z = P_0(x_0) + P_1(x_1) \quad \text{(Eqn. 6)}$$

The set S of all z that are generated by the superposition of the permutations of the basis vectors $x_0$ and $x_1$ defines a signal constellation. In preferred embodiments, this signal constellation is used to transmit information according to Equation 1. In a preferred embodiment, the basis vectors $x_0$ and $x_1$ are chosen in such a way that the map from $x_0$ and $x_1$ to an element z of S is one-to-one.

Superposition Signaling Encoding for l>2

Figure 27:
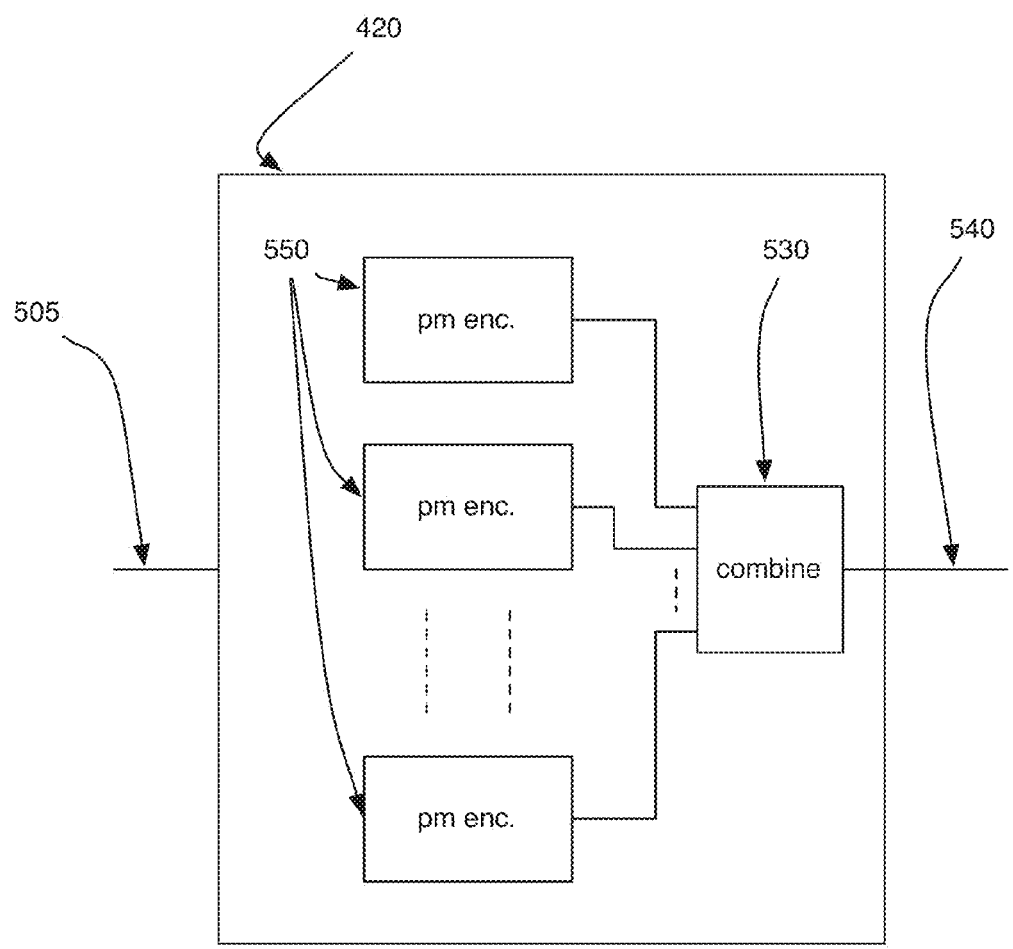
FIG. 27 illustrates another embodiment of the encoder of FIG. 3 in greater detail.

The above scheme may be extended to using more than two basis vectors to generate encoded vectors z. In a preferred embodiment, a transmit unit uses three or even more basis vectors. A preferred embodiment where more than two basis vectors are used is exemplified in FIG. 27. Encoder 420 comprises l PM encoders 550. The i-th PM encoder 550(i) is defined by a basis vector $x_i$. PM encoder 550(i) takes as its input a set of $k_i$ bits and maps these into a permutation of the basis vector $x_i$. Let the permutation of the i-th basis vector $x_i$ be denoted by $P_i(x_i)$. These permuted vectors are input to combine unit 530, which outputs signals 528 having n components for n wires (not shown). In certain embodiments, the lengths of the vectors $x_i$ may be the same, and combine unit 530 may generate an encoded vector z of the form shown in Equation 7.

$$z = \sum_{i=0}^{l-1} P_i(x_i). \quad \text{(Eqn. 7)}$$

For the purpose of this disclosure, it is assumed that for at least one of the basis vectors $x_i$ more than two permutations of $x_i$ are used. The signal constellation S is defined by the set of all possible z and the code it defines is referred to herein as a "superposition signaling code" while the number l is referred to as the number of layers of the superposition signaling code.

First Examples of Superposition Signaling Codes

A first example of a superposition signaling code for transmission on five wires is furnished by choosing the basis vectors $x_0=[1\ 0\ 0\ 0\ -1]$ and $x_1=[3\ 0\ 0\ 0\ -3]$. Here, l=2, i.e., the superposition signaling code comprises two layers. The basis vectors $x_0$ and $x_1$ are both a scaled version of the vector $[1\ 0\ 0\ 0\ -1]$. There are 20 distinct permutations of this vector. When z is generated according to Equation 6, the mapping from $P_0(x_0)$ and $P_1(x_1)$ to z is one-to-one. The resulting signal constellation S comprises 400 elements. Table 1 gives several elements of the resulting signal constellation S for several permutations of $x_0$ and $x_1$. Only a few of the possible constellation points are illustrated, with different "shapes" of z.

TABLE 1

| $P_0(x_0)$ | $P_1(x_1)$ | z |
| --- | --- | --- |
| [−1 1 0 0 0] | [−3 3 0 0 0] | [−4 4 0 0 0] |
| [1 −1 0 0 0] | [−3 3 0 0 0] | [−2 2 0 0 0] |
| [−1 0 1 0 0] | [−3 3 0 0 0] | [−4 3 1 0 0] |
| [−1 0 1 0 0] | [3 −3 0 0 0] | [2 −3 1 0 0] |
| [1 0 −1 0 0] | [−3 3 0 0 0] | [−2 3 −1 0 0] |
| [1 0 −1 0 0] | [3 −3 0 0 0] | [4 −3 −1 0 0] |
| [0 0 1 −1 0] | [3 −3 0 0 0] | [3 −3 1 −1 0] |

The elements of the resulting signal constellation are all permutations of one of the following vectors: [−4 4 0 0 0], [−2 2 0 0 0], [−4 0 0 1 3], [−3 0 0 1 2], [−3 −1 0 0 4] and [−3 −1 0 1 3].

Since the sum of elements of $x_0$ and $x_1$ is equal to zero for any point, the sum of the words of S is equal to zero as well. In a preferred embodiment, the transmit unit may use 16 different permutations of $x_0$ and 16 different permutations of $x_1$. In that case, $k_0=4$ and $k_1=4$ and with the resulting superposition signaling code eight bits may be encoded into a codeword for transmission over a communication bus comprising five wires. This superposition signaling code is referred to as an "8b5w" code. (In the general case, the code is a "kbnw" code indicating that it signals for k bits over n wires each period.)

A second example of a superposition signaling code comprising two layers is furnished by choosing the basis vectors $x_0$ and $x_1$ as $x_0=[1\ 1\ -1\ -1]$ and $x_1=[2\ 2\ -2\ -2]$. Table 2 gives several examples of elements of the resulting signal constellation S for several permutations of $x_0$ and $x_1$.

TABLE 2

| $P_0(x_0)$ | $P_1(x_1)$ | z |
|---|---|---|
| [−1 −1 1 1] | [−2 −2 2 2] | [−3 −3 3 3] |
| [−1 −1 1 1] | [2 2 −2 −2] | [1 1 −1 −1] |
| [−1 −1 1 1] | [−2 2 −2 2] | [−3 1 −1 3] |
| [1 −1 1 −1] | [−2 2 −2 2] | [−1 1 −1 1] |
| [1 1 −1 −1] | [−2 2 −2 2] | [−1 3 −3 1] |

There exist six different permutations of $x_0$ and six different permutations of $x_1$. The resulting superposition signaling code has 36 different elements. These elements are all permutations of one of the following basis vectors: [−3 −3 3 3], [1 1 −1 −1] and [−3 1 −1 3]. Each of these vectors has the property that the sum of all elements is equal to 0. In a preferred embodiment, encoder 420 may use four different permutations of $x_0$ and four different permutations of $x_1$ and thus $k_0=2$ and $k_1=2$. This allows at least four bits to be encoded into a codeword. This superposition signaling code is referred to as a 4b4w code.

An example of a superposition signaling code comprising three layers is furnished by choosing the basis vectors $x_0$, $x_1$ and $x_2$ as $x_0=[1\ 1\ 0\ 0\ 0\ 0\ -1\ -1]$, $x_1=[3\ 3\ 0\ 0\ 0\ 0\ -3\ -3]$ and $x_2=[9\ 9\ 0\ 0\ 0\ 0\ -9\ -9]$. Table 3 gives several examples of elements of the resulting signal constellation S.

TABLE 3

| $P_0(x_0)$ | $P_1(x_1)$ | $P_2(x_2)$ | z |
|---|---|---|---|
| [−1 −1 1 1 0 0 0 0] | [−3 −3 3 3 0 0 0 0] | [−9 −9 9 9 0 0 0 0] | [−13 −13 13 13 0 0 0 0] |
| [0 −1 0 1 0 −1 0 1] | [3 3 −3 0 0 −3 0 0] | [0 9 −9 0 9 −9 0 0] | [3 11 −12 1 9 −13 0 1] |
| [0 1 0 −1 0 1 −1 0] | [−3 −3 3 3 0 0 0 0] | [9 0 −9 0 0 −9 0 9] | [6 −2 −6 2 0 −8 −1 9] |
| [0 1 0 −1 0 1 −1 0] | [3 0 0 −3 3 −3 0 0] | [9 0 −9 0 0 −9 0 9] | [12 1 −9 −4 3 −11 −1 9] |

There exist 420 different permutations of the basis vectors $x_0$, $x_1$ and $x_2$. In a preferred embodiment, 256 permutations of each of the vectors $x_0$, $x_1$ and $x_2$ are used, $k_0=k_1=k_2=8$ and the resulting superposition signaling codes is referred to as a 24b8w code.

Encoding Processes for Superposition Signaling Codes

A first step of encoding a superposition signaling code comprises encoding the basis vectors for individual permutation modulation codes. For the i-th layer of the superposition signaling code, this process amounts to mapping $k_i$ bits uniquely to permutations of the basis vector $x_i$. This might not be straightforward in general if an encoder has to run at very high speeds and consume very low power. A general approach of encoding a set of $k_0$ bits into a permutation of $x_0$ uses an index generator.

Figure 6:
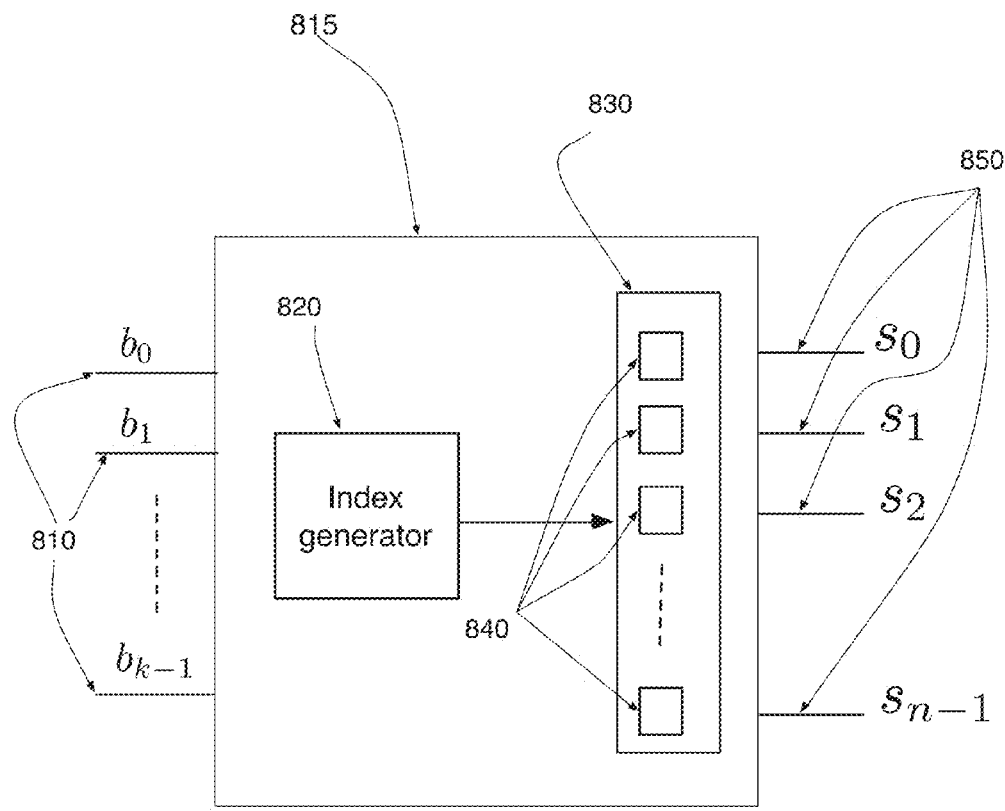
FIG. 6 illustrates an encoder that uses an index generator.

FIG. 6 illustrates an encoder that uses an index generator. As shown there, a PM encoder 815 comprises inputs 810, an index generator 820, a storage unit 830 having storage elements 840, and outputs 850. Storage elements 840 can be capacitive storage, inductive storage, circuit storage, memory or other suitable circuit elements to store index values. PM encoder 815 might be used an encoder 550 of FIG. 5.

A general operation of PM encoder 815 will be explained with reference to one basis vector $x_0$ but by extension can be repeated for the other layers of the superposition signaling code. In FIG. 6, the number of bits in is k and the number of signals out is n, but since PM encoder 815 is for one layer (multiple instances are used for other layers), it handles $k_0$ bits and is defined by a basis vector $x_0$ of size n that has the form shown in Equation 8.

$$x_0 = (\underbrace{a_0, \ldots, a_0}_{n_0}|\underbrace{a_1, \ldots, a_1}_{n_1}|\ldots|\underbrace{a_t, \ldots, a_t}_{n_t}) \quad \text{(Eqn. 8)}$$

Input 810 of PM encoder 815 comprises $k_0$ bits $b_0, \ldots, b_{k0-1}$ and a task of PM encoder 815 is to generate a permutation of $x_0$ denoted by $P_0(x_0)$. PM encoder 815 comprises an index generator 820 whose task it is to generate a set of N indices, where N is the sum of the components of $x_0$, as given by Equation 9.

$$N = \sum_{i=0}^{t-1} n_i \quad \text{(Eqn. 9)}$$

Index generator 820 generates $n_0$ indices that identify the position of the $a_0$'s in the permutation of $P_0(x_0)$, $n_1$ indices that identify the position of the $a_1$'s in $P_0(x_0)$, etc. Indices need only be generated for $a_0, \ldots, a_{t-1}$ since $P_0(x_0)$ is completely defined by these indices.

The set of these N indices is denoted by $i_0, \ldots, i_{N-1}$. PM encoder 815 may comprise storage unit 830 that contains n storage elements 840. Each of these storage elements 840 is able to store at least the different positions of $x_0$. The values of storage elements 840 are initialized by the values of the $a_i$. The indices $i_0, \ldots, i_{N-1}$ are used to set the corresponding storage elements 840 to the value that corresponds to the index. In this way, a permutation of $x_0$ is available in storage unit 830. The output of PM encoder 815 is a set of n signals 850 that are denoted by $s_0, \ldots, s_{n-1}$. Each of the output signals 850 is connected to one of the storage elements 840 in storage unit 830.

The value of the output signals 850 is a physical representation of the value in the corresponding storage element 840. There are other ways to specify an encoder for a permutation modulation code. The encoder exemplified in FIG. 6 is meant only as an illustration for such a specification. In practice, a simple process is preferred for generating the indices $i_0, \ldots, i_{N-1}$. Several such processes for several basis vectors $x_0$ are disclosed below.

The 4b5w Code

Consider the case where one or more layers of the superposition signaling code is defined by a permutation modulation code that is defined by the basis vector x=[1 0 0 0 -1]. This vector may be scaled by an arbitrary constant. For instance, the two layers of the 8b5w code can be defined by two scaled versions of x. In a preferred embodiment, 16 different permutations of this basis vector are used. This allows the encoder to encode four bits into a permutation of x. This is referred to herein as the 4b5w code.

Figure 7:
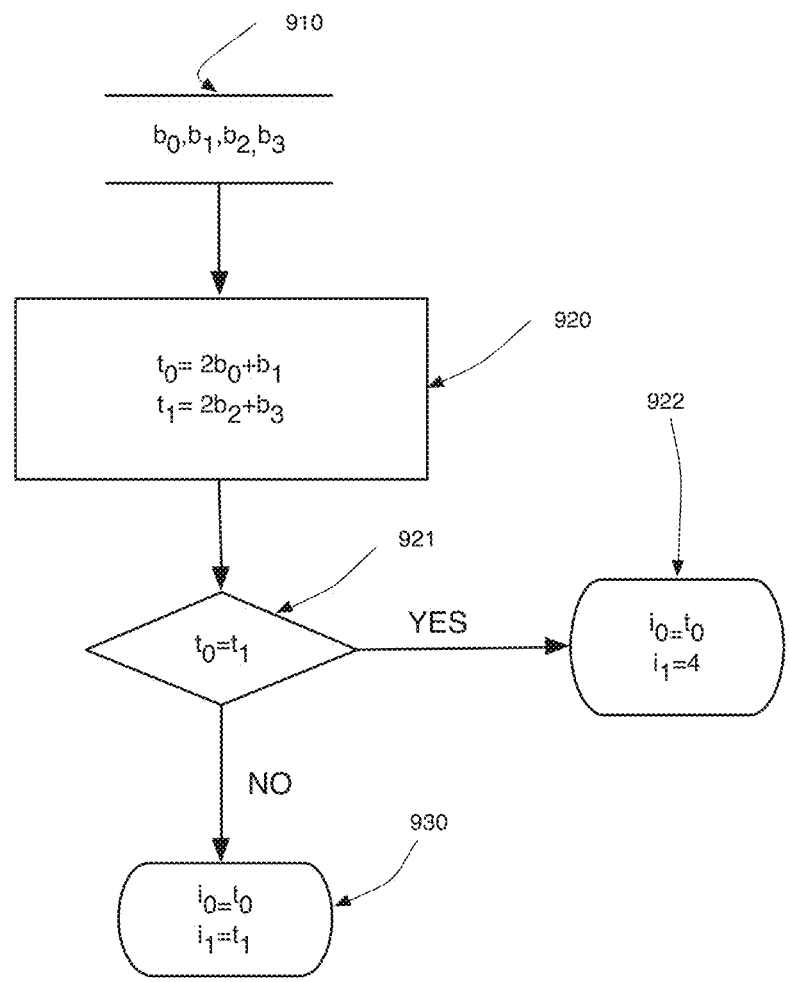
FIG. 7 is a flowchart of an encoding process that may be used by an index generator to define a permutation of a basis vector.

FIG. 7 is a flowchart of an encoding process that may be used by index generator 820 to define a permutation of x. There, the permutation of x is denoted by P(x). The process might be performed by an encoder. As indicated, from the input (four bits, $b_0, \ldots, b_3$) 910, two indices, $i_0$ and $i_1$ are generated. The index $i_0$ may indicate the position of the -1 in P(x) and the index $i_1$ may indicate the position of the 1 in P(x).

At step 920, the bits are split in two pairs and represented by their integer representations, $t_0$ and $t_1$. At step 921, the two integers $t_0$ and $t_1$ are compared (921). If they are equal, the index $i_0$ is set to $t_0$ and the index $i_1$ is set to four (922). If $t_0$ and $t_1$ are not equal, the index $i_0$ is set to $t_0$ and the index $i_1$ is set to $t_1$ (930). The output of the process comprises the indices $i_0$ and $i_1$. Storage elements 840 of the encoder may be initialized by a value of 0 and the indices $i_0$ and $i_1$ may be used to set the $i_0$-th storage element of 840 to -1 and to set the $i_1$-th storage element to 1. This results in the mapping from bits to permutation of x as shown in Table 4.

TABLE 4

| $b_0, b_1, b_2, b_3$ | P (x) |
|---|---|
| 0, 0, 0, 0 | [-1, 0, 0, 0, 1] |
| 0, 0, 0, 1 | [-1, 1, 0, 0, 0] |
| 0, 0, 1, 0 | [-1, 0, 1, 0, 0] |
| 0, 0, 1, 1 | [-1, 0, 0, 1, 0] |
| 0, 1, 0, 0 | [1, -1, 0, 0, 0] |
| 0, 1, 0, 1 | [0, -1, 0, 0, 1] |
| 0, 1, 1, 0 | [0, -1, 1, 0, 0] |
| 0, 1, 1, 1 | [0, -1, 0, 1, 0] |
| 1, 0, 0, 0 | [1, 0, -1, 0, 0] |
| 1, 0, 0, 1 | [0, 1, -1, 0, 0] |
| 1, 0, 1, 0 | [0, 0, -1, 0, 1] |
| 1, 0, 1, 1 | [0, 0, -1, 1, 0] |
| 1, 1, 0, 0 | [1, 0, 0, -1, 0] |
| 1, 1, 0, 1 | [0, 1, 0, -1, 0] |
| 1, 1, 1, 0 | [0, 0, 1, -1, 0] |
| 1, 1, 1, 1 | [0, 0, 0, -1, 1] |

Extensions of the 4b5w Code

The 4b5w code described above can be generalized to a larger family of permutation modulation codes with similar properties. This family of permutation modulation codes is defined by a basis vector of the following form shown in Equation 10.

$$x = \begin{bmatrix} 1 & \underbrace{0 \ldots 0}_{2^k-1} & -1 \end{bmatrix} \quad \text{(Eqn. 10)}$$

The dimension of the basis vector x is $2^k+1$ and it contains a single 1, a single -1 and $2^k-1$ zeros. The 4b5w code is a specific example for k=2. The basis vector x given by Equation 10 allows the encoder to map 2k bits into a permutation of x.

Figure 8:
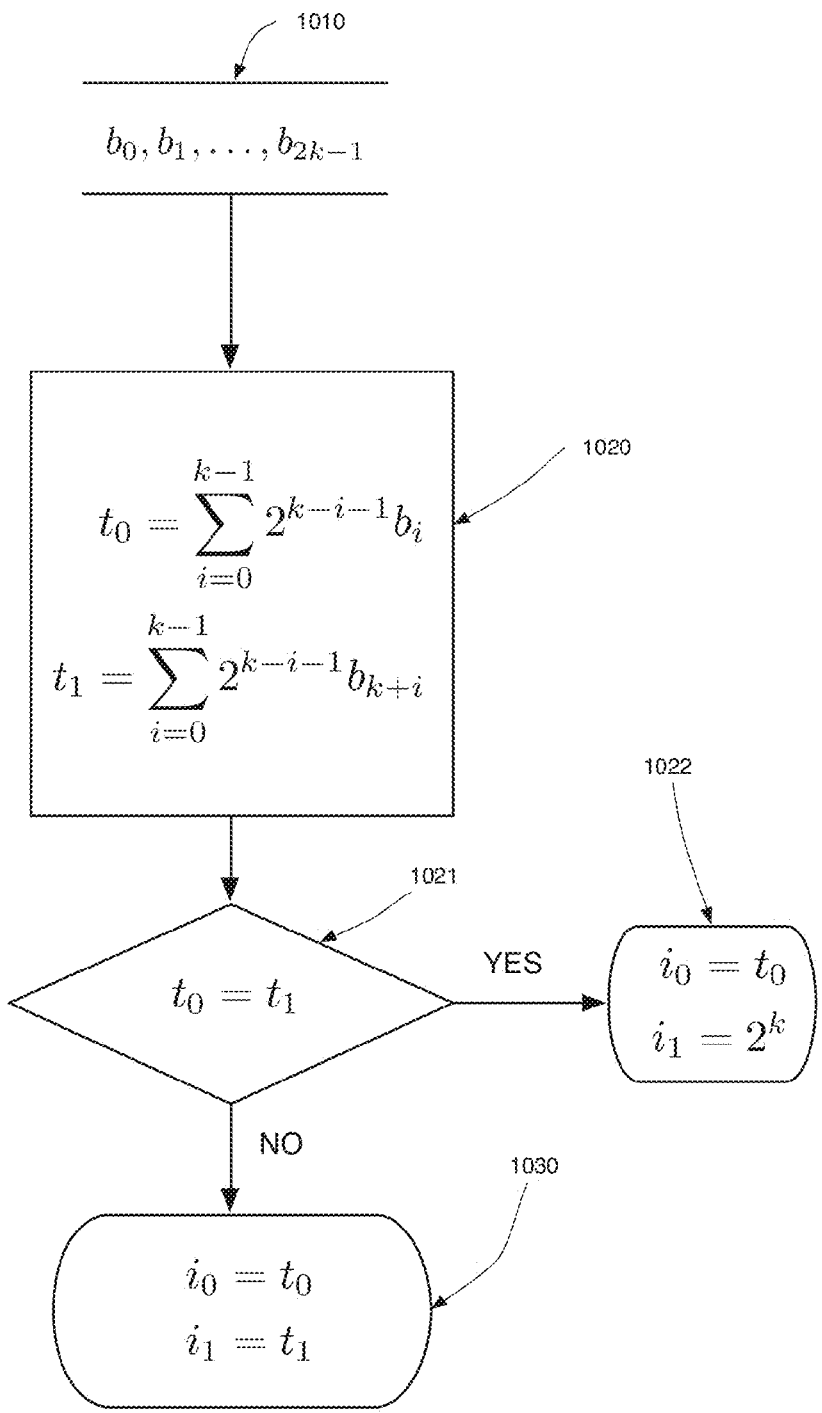
FIG. 8 is a flowchart of an encoding process that may be used by an index generator to define a permutation of a basis vector with a more general basis vector.

FIG. 8 is a flowchart of an encoding process that may be used by an index generator to define a permutation of a basis vector with the more general basis vector. As illustrated there, inputs 1010 are a set of 2k bits, denoted $b_0, \ldots, b_{2k-1}$. The output of the process is the two integers $i_0$ and $i_1$. In step 1020, two indices $t_0$ and $t_1$ are formed based on the input bits $b_0, \ldots, b_{2k-1}$. In step 1021, the indices $t_0$ and $t_1$ are compared. If they are equal, the output integers $i_0$ and $i_1$ are set according to step 1022. If they are not equal, the output integers $i_0$ and $i_1$ are set according to step 1030. Storage elements 840 may be initialized by a value of 0 and the indices $i_0$ and $i_1$ may be used to set the $i_0$-th storage element of 840 to -1 and to set the $i_1$-th storage element to 1 to finalize the encoding of the k bits into a permutation of x.

The 8b8w Code

Suppose one or more layers of the superposition signaling code is defined by a PM code that is defined by the basis vector x=[1 1 0 0 0 0 -1 -1]. Note that this vector may be scaled by an arbitrary constant. The three layers of the 24b8w code are defined by three scaled versions of x. In the example above, 256 different permutations of x are used for the 8b8w code.

Figure 9:
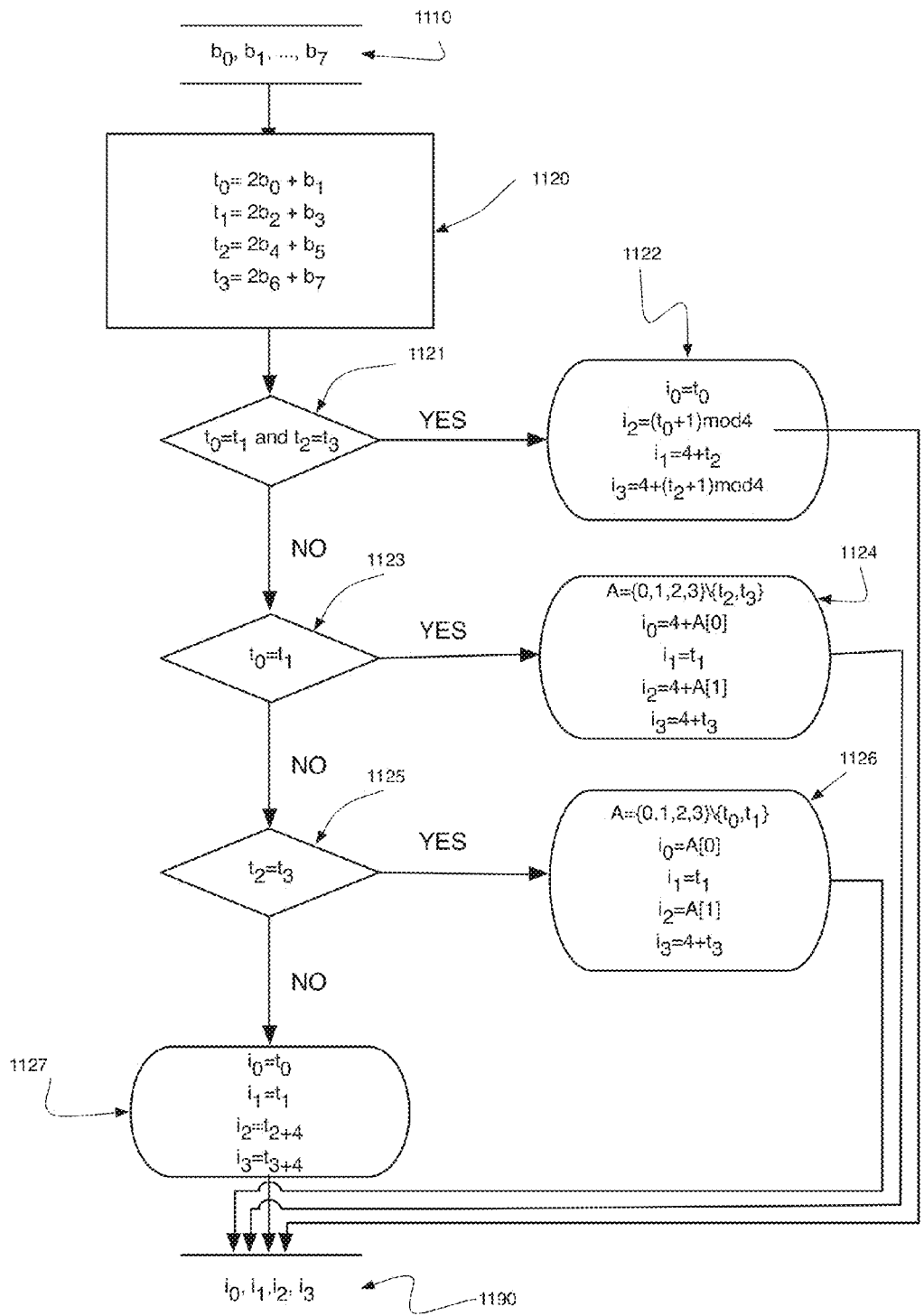
FIG. 9 is a flowchart of an encoding process that may be used by an index generator to define a permutation of a basis vector for an 8b8w code.

FIG. 9 is a flowchart of an encoding process that may be used by an index generator to define a permutation of a basis vector for an 8b8w code. That process might be implemented by index generator 820 to generate four indices $i_0, \ldots, i_3$ that correspond to the positions of the 1's and the -1's in the permutation of x. The inputs 1110 to the process are the bits $b_0, \ldots, b_7$ and the outputs 1190 of the encoding process are the four indices $i_0, i_1, i_2$ and $i_3$. The indices $i_0$ and $i_2$ are equal to the positions of the -1's in a vector that corresponds to the permutation of the basis vector $x_0$ and the indices $i_1$ and $i_3$ are equal to the positions of the 1's. In step 1120, four indices $t_0, \ldots, t_3$ are formed from the eight input bits in 1110. The way this is done is by converting pairs of input bits to their decimal representation, i.e., $b_0$ and $b_1$ are converted to $2b_0+b_1$. In the process exemplified in FIG. 9, four different cases can be distinguished.

The first case is tested for in step 1121 and occurs when $t_0=t_1$ and $t_2=t_3$. When this case is true, the indices $i_0, \ldots, i_3$ are set according to the calculations performed in step 1122.

The second case is tested for in step 1123 and occurs when $t_0=t_1$ and $t_2 \neq t_3$. When this case is true, indices $i_0, \ldots, i_3$ are set according to the calculations performed in step 1124. In step 1124, the set A is formed as follows. Initially, the set A contains the integers 0, 1, 2 and 3. From this set, the integers $t_2$ and $t_3$ are removed. The smallest element of the remaining set is denoted by A [0] and the largest element of the remaining set is denoted by A[1].

The third case is tested for in step 1125 and occurs when $t_0 \neq t_1$ and $t_2=t_3$. When this case is true, indices $i_0, \ldots, i_3$ are set according to the calculations performed in step 1126.

The fourth case is the default case and occurs when $t_0 \neq t_1$ and $t_2 \neq t_3$. When this case occurs, the indices $i_0, \ldots, i_3$ are set according to step 1127. The output of the process comprises the indices $i_0, i_1, i_2, i_3$.

The storage elements 840 may be initialized by a value of 0 and the indices $i_0$ and $i_2$ may be used to set the $i_0$-th and $i_2$-th storage element of 840 to -1 and to set the $i_1$-th and $i_3$-th storage element to 1.

The resulting map from bits $b_0, \ldots, b_7$ to indices $i_0, i_1, i_2, i_3$ is illustrated in FIG. 10, which shows a map from the decimal representation of $b_0, \ldots, b_7$ to the indices $i_0, \ldots, i_3$.

In a more general case, the problem is to find efficient processes for encoding, or else any gains in transmission power consumption might be lost to increases in computing power consumption. This above example is specific to mapping 8 input bits to one of 256 permutations of a vector of the form [a a b b b b c c] and is relatively simple to implement in hardware. The equality tests break up the encoding task into disjoint sub-problems and for each of these sub-problems, encoding can be performed such that the overall mapping is one-to-one.

Examples of Construction of Superposition Signaling Codes

In the above examples, each permutation modulation code of the superposition signaling code is encoded separately and these layers are then combined to obtain a codeword of the superposition signaling code.

Figure 11:
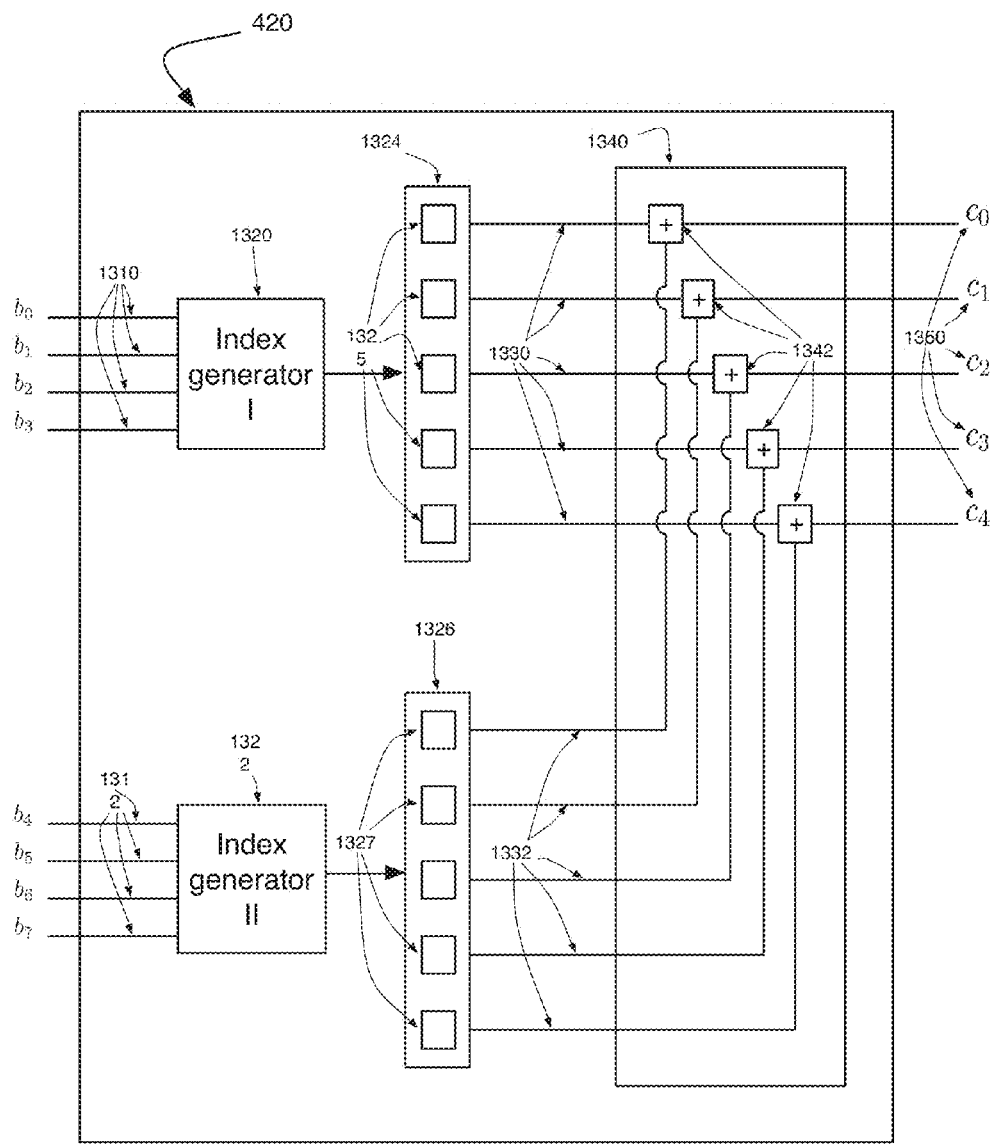
FIG. 11 is a block diagram of an encoder for an 8b5w code.

FIG. 11 is a block diagram of an encoder for the 8b5w code. The encoder comprises two index generators 1320, 1322. The inputs 1310 to the first index generator 1320 are the bits $b_0, \ldots, b_3$. The index generator 1320 may implement the process of FIG. 7 to map the bits $b_0, \ldots, b_3$ to a permutation of the basis vector $x_0$ that defines the first layer of the 8b5w superposition signaling code. This basis vector may be given by $x_0 = [1\ 0\ 0\ 0\ -1]$. Storage elements 1325 of a storage device 1324 are initially set to 0. The indices generated by index generator 1320 are used to set the corresponding storage elements 1325 of storage device 1324. The outputs 1330 of storage device 1324 are denoted by $v_0, \ldots, v_4$ and the i-th of these outputs 1330 may be a physical representation of the i-th storage element in storage device 1324.

The inputs 1312 to the second index generator 1322 are the bits $b_4, \ldots, b_7$. The index generator 1322 may implement the process of FIG. 7 to map the bits $b_4, \ldots, b_7$ to a permutation of the basis vector defining the second layer of the 8b5w superposition signaling code. This basis vector may be given by $x_1 = [3\ 0\ 0\ 0\ -3]$. Storage elements 1327 of a storage device 1326 are initially set to 0. The indices generated by index generator 1322 are used to set the corresponding storage elements 1327 of storage device 1326. The outputs 1332 of storage device 1326 are denoted by $w_1, \ldots, w_4$ and the i-th of these outputs 1332 may be a physical representation of the i-th storage element in storage device 1326.

The output of storage device 1324 and the output of storage device 1326 are the input of a combine unit 1340. Combine unit 1340 generates its outputs 1350, which are denoted by $c_0, \ldots, c_4$ as the vector addition of $v_0, \ldots, v_4$ and $w_1, \ldots, w_4$ as illustrated in Equation 11.

$$\begin{bmatrix} c_0 \\ c_1 \\ c_2 \\ c_3 \\ c_4 \end{bmatrix} = \begin{bmatrix} v_0 \\ v_1 \\ v_2 \\ v_3 \\ v_4 \end{bmatrix} + \begin{bmatrix} w_0 \\ w_1 \\ w_2 \\ w_3 \\ w_4 \end{bmatrix} \quad \text{(Eqn. 11)}$$

The addition is performed by addition units 1342.

Figure 12:
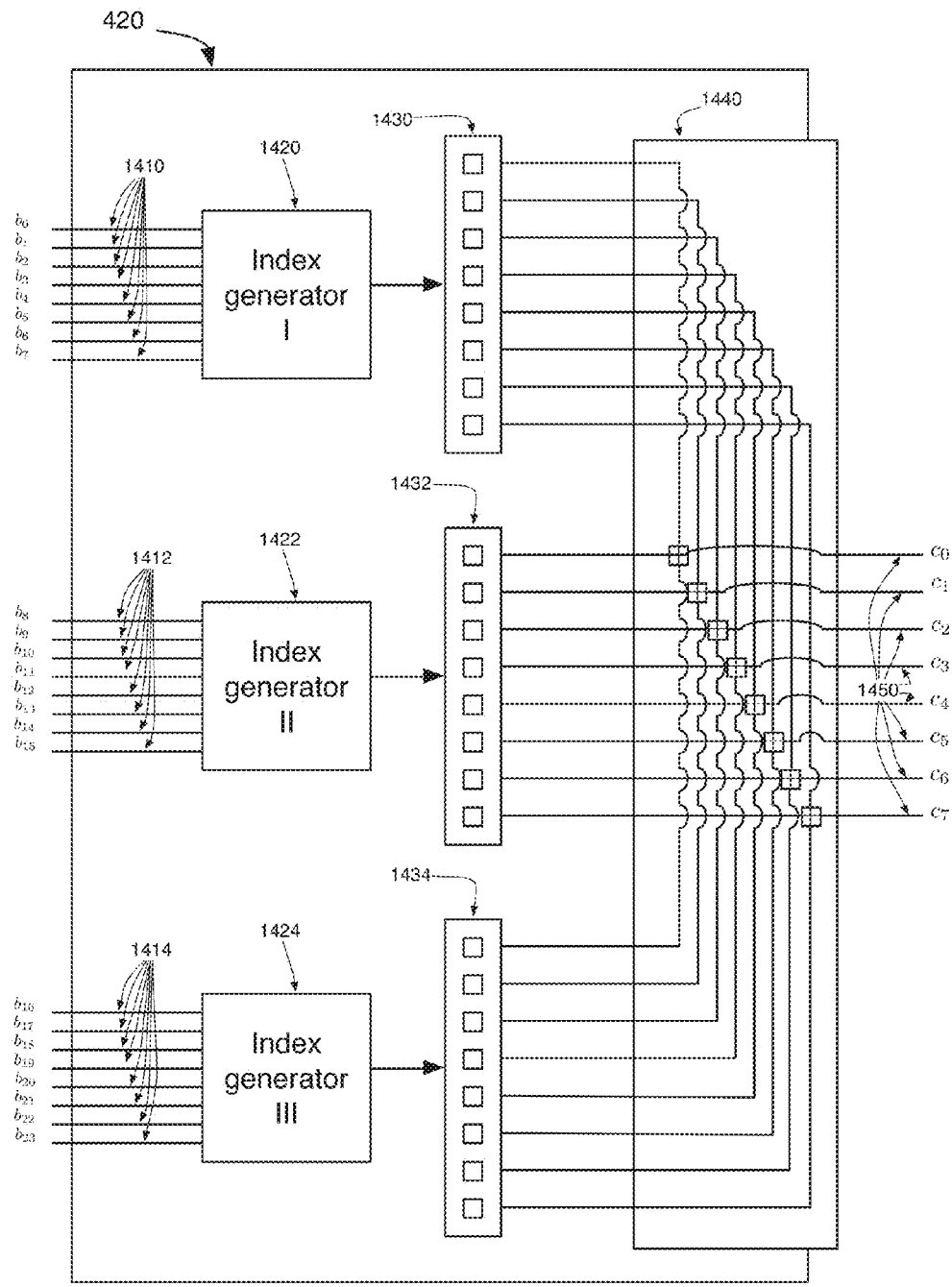
FIG. 12 is a block diagram of an encoder for a 24b8w code.

FIG. 12 shows the counterpart of an encoder for the 24b8w code. The encoder comprises three index generators 1420, 1422, 1424. The inputs 1410 to the first index generator 1420 are the bits $b_0, \ldots, b_7$. The index generator 1420 may implement the process of FIG. 9 to generate four indices corresponding to the non-zero position of the basis vector $x_0$ that for the first layer of the 24b8w code is given by $x_0 = [1\ 1\ 0\ 0\ 0\ 0\ -1\ -1]$.

The inputs 1412 to the second index generator 1422 are the bits $b_8, \ldots, b_{15}$. The index generator 1422 may implement the process of FIG. 9 to generate four indices corresponding to the non-zero position of the basis vector $x_1$ that for the second layer of the 24b8w code is given by $x_1 = [3\ 3\ 0\ 0\ 0\ 0\ -3\ -3]$.

The inputs 1414 to the third index generator 1424 are the bits $b_{16}, \ldots, b_{23}$. The index generator 1424 may implement the process of FIG. 9 to generate four indices corresponding to the non-zero position of the basis vector $x_2$ that for the third layer of the 24b8w code is given by $x_2 = [9\ 9\ 0\ 0\ 0\ 0\ -9\ -9]$.

The outputs of each index generator 1420, 1422, 1424 is sent to a corresponding storage device 1430, 1432, 1434. Each of the storage elements of these storage devices 1430, 1432, 1434 is initialized with a value of 0. The storage elements corresponding to the indices received from the corresponding index generators 1420, 1422, 1424 are set to the non-zero values of the corresponding basis vector. The output of storage device 1430 is denoted by $v_1, \ldots, v_7$, the output of storage device 1432 is denoted by $w_1, \ldots, w_7$ and the output of storage device 1434 is denoted by $u_1, \ldots, u_7$. These outputs are input to a combine unit 1440 that generates the outputs $c_0, \ldots, c_7$ as illustrated in Equation 12 as the vector addition of the outputs of the three storage devices.

$$\begin{bmatrix} c_0 \\ c_1 \\ c_2 \\ c_3 \\ c_4 \\ c_5 \\ c_6 \\ c_7 \end{bmatrix} = \begin{bmatrix} v_0 \\ v_1 \\ v_2 \\ v_3 \\ v_4 \\ v_5 \\ v_6 \\ v_7 \end{bmatrix} + \begin{bmatrix} w_0 \\ w_1 \\ w_2 \\ w_3 \\ w_4 \\ w_5 \\ w_6 \\ w_7 \end{bmatrix} + \begin{bmatrix} u_0 \\ u_1 \\ u_2 \\ u_3 \\ u_4 \\ u_5 \\ u_6 \\ u_7 \end{bmatrix} \quad \text{(Eqn. 12)}$$

The 8b8w code and the 24b8w code are members of a family of superposition signaling codes. The members of this family are the 8lb8w codes, where l denotes the number of layers. The basis vector for the i-th layer is given by $[3^i\ 3^i\ 0\ 0\ 0\ 0\ -(3^1)\ -(3^1)]$ where the first layer is indexed for i=0. For these codes the architecture of FIG. 12 may be extended to comprise l index generators, l storage devices and a combine unit that can handle l inputs.

Drivers and Combine Units

Voltage-Mode and Current-Mode Drivers

Figure 13:
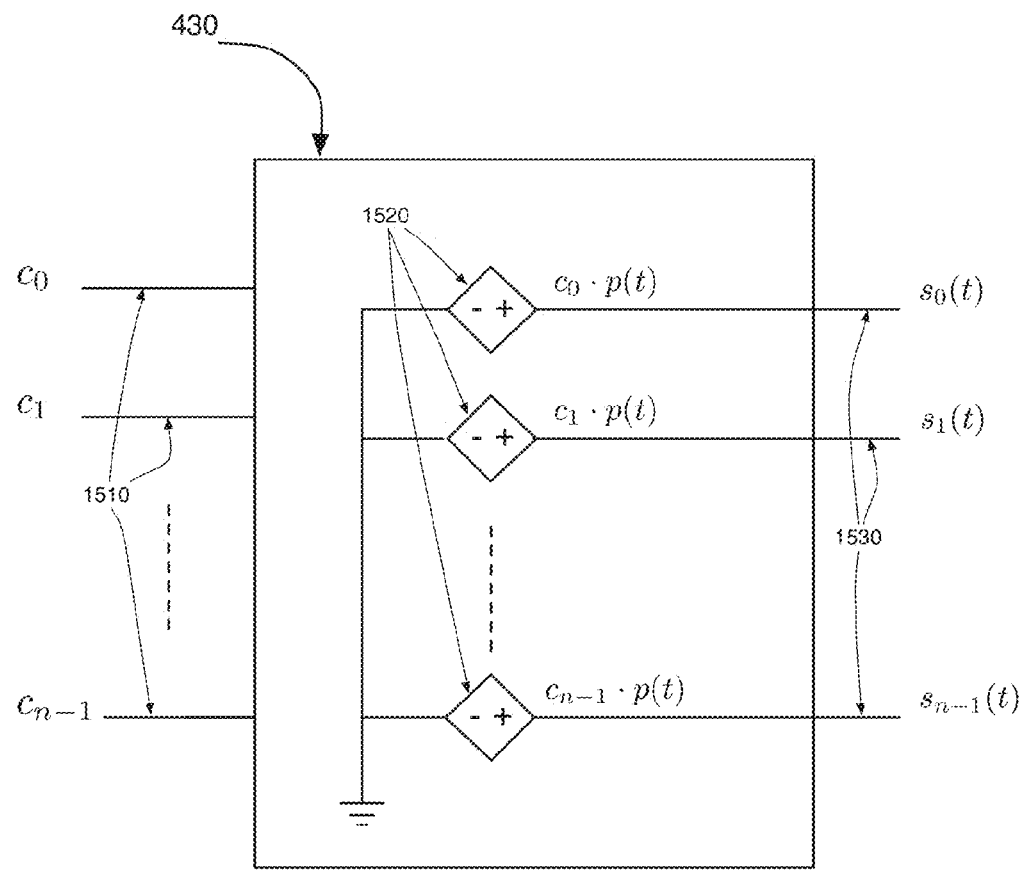
FIG. 13 illustrates an example circuit that might be used for the driver in the circuit of FIG. 3.

FIG. 13 illustrates an example circuit that might be used for driver 430 in the circuit of FIG. 3. In this example, the signals are voltage signals. Thus, for a superposition signaling code of length n, the wires of the communication bus are driven in voltage mode. Inputs 1510 to the driver are the numbers $c_0, \ldots, c_{n-1}$. These numbers may be represented in some physical form, such as a current or voltage in an electronic circuit. In a bus communication system, a set of n of these numbers may be available every T seconds and these numbers may represent a codeword from a superposition signaling code. The driver may comprise a set of n controlled voltage sources 1520. Each of the voltage sources 1520 is connected to one of the outputs 1530. Outputs 1530 are denoted by $s_0(t), \ldots, s_{n-1}(t)$. Each of the voltage sources 1520 may generate a pulse shape, p(t), that may be modulated according to inputs 1510. The i-th voltage source may generate the i-th output as $s_i(t) = c_i p(t)$. As should be apparent upon reading this disclosure, the driver of FIG. 13 drives the wires according to Equation 1.

Every interval of T seconds, a new codeword of the superposition signaling may be available and the driver may change its outputs 1530 accordingly. Since the driver comprises voltage sources 1520, the output signals $s_0(t), \ldots, s_{n-1}(t)$ define the voltage on the wires.

The driver may include other functions such as equalization, amplification and crosstalk cancellation. Furthermore, the driver may terminate the bus in its characteristic impedance.

In another embodiment, the wires of the communication bus are driven in current-mode. In such an embodiment of the driver, the controlled voltage sources 1520 of FIG. 13 might be omitted and instead may appear controlled current sources.

Figure 14:
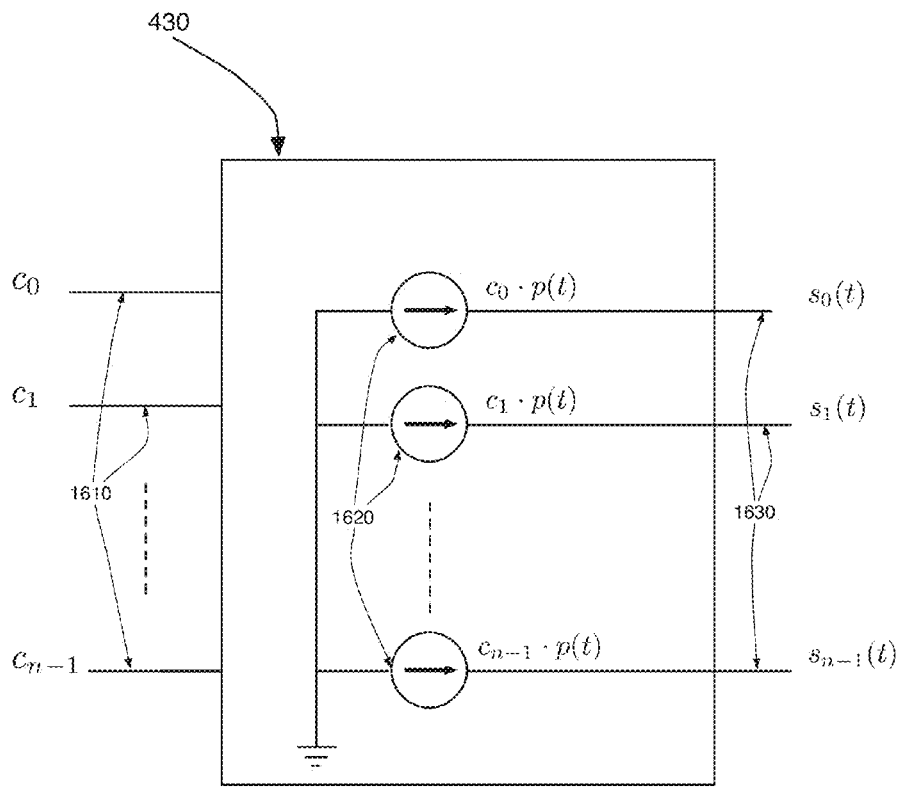
FIG. 14 illustrates an example circuit that might be used for the driver in the circuit of FIG. 3, with controlled current sources.

This is illustrated in FIG. 14, wherein inputs 1610 of the driver may be used to control the controlled current sources 1620. In this case, outputs 1630 of the driver (denoted by $s_0(t), \ldots, s_{n-1}(t)$) define the currents on the wires of the communication bus.

The currents generated by current-sources 1620 may be positive or negative. In a practical setting, it may be difficult to generate currents with both positive and negative values. Separate current-sources may be used for the positive and negative currents to deal with this situation.

Figure 15:
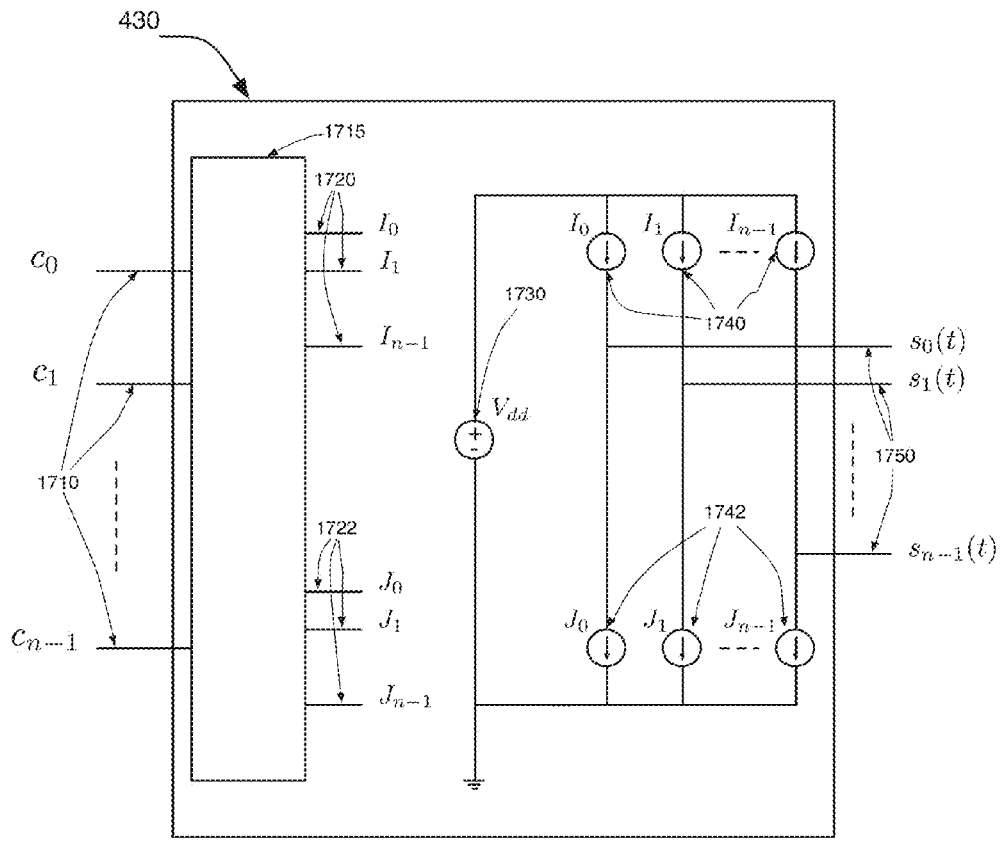
FIG. 15 is a block diagram of a circuit for handling currents with both positive and negative values.

FIG. 15 is a block diagram of a circuit that might be used. As shown there, inputs 1710 to the driver are denoted by $c_0, \ldots, c_{n-1}$ and denote a representation of the codeword from the superposition signaling code. A unit 1715 generates two sets of numbers from $c_0, \ldots, c_{n-1}$. The first set of these numbers 1720 is denoted by $I_0, \ldots, I_{n-1}$ and is generated by unit 1715 according to Equation 13.

$$I_i = \frac{|c_i| + c_i}{2} \qquad \text{(Eqn. 13)}$$

The second set of these numbers is denoted by $J_0, \ldots, J_{n-1}$ and is generated by unit 1715 according to Equation 14.

$$J_i = \frac{|c_i| - c_i}{2} \qquad \text{(Eqn. 14)}$$

The numbers $I_0, \ldots, I_{n-1}$ correspond to the absolute values of the positive values of $c_0, c_{n-1}$. The numbers $J_0, \ldots, J_{n-1}$ correspond to the absolute values of the negative values of $c_0, \ldots, c_{n-1}$. The driver may comprise n controlled current-sources 1740. The i-th of these controlled current sources 1740 sources a current of size $I_i$ into the i-th wire. The current is sourced from the positive terminal of a voltage source 1730 that has value Vdd. Furthermore, the driver may comprise n controlled current-sources 1742. The i-th of these controlled current sources 1742 sinks a current of size from the i-th wire. The current is sunk into the negative terminal of voltage source 1730. The negative terminal of voltage source 1730 may be connected to ground.

Figure 16:
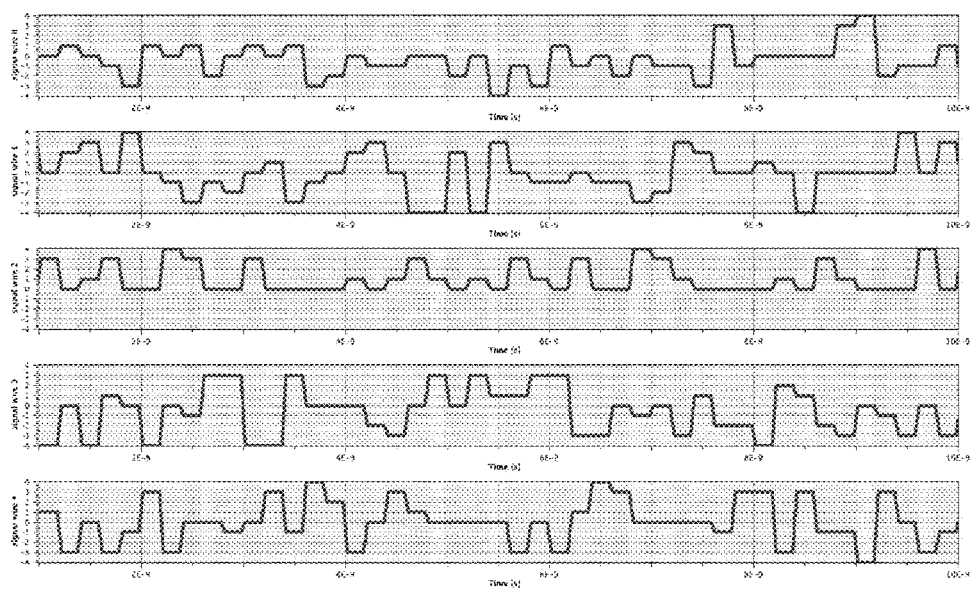
FIG. 16 is an illustration of examples for signals that are driven on a communication bus.

FIG. 16 is an illustration of examples for signals, to provide a better understanding of the signals that are driven on the communication bus. The pulse shape, p(t), may be chosen as pulse shape 520 (see FIG. 4(b)). Consider the case where the time interval, T, is 200 picoseconds. The encoder may implement the 8b5w superposition signaling code, in which case the signals $s_0(t), \ldots, s_{n-1}(t)$ that are driven on the five wires of the communication bus may have the form as shown in FIG. 16.

FIG. 16 shows the waveforms $s_0(t), \ldots, s_{n-1}(t)$ for several time intervals of 200 picoseconds each. In each time interval, eight (possibly) arbitrary bits are encoded into an element of the 8b5w code. The driver may generate the signals as shown in FIG. 15 for transmission over the bus. The signals shown in FIG. 16 may represent voltages and/or currents.

The combine units of the encoder may be implemented as summers for physical addition of physical quantities. In some cases, the combine unit may be omitted from the encoder itself or implemented by the existence of particular wires. One advantage of this is that no additional hardware is required to perform the actual operation performed by the combine unit.

Figure 17:
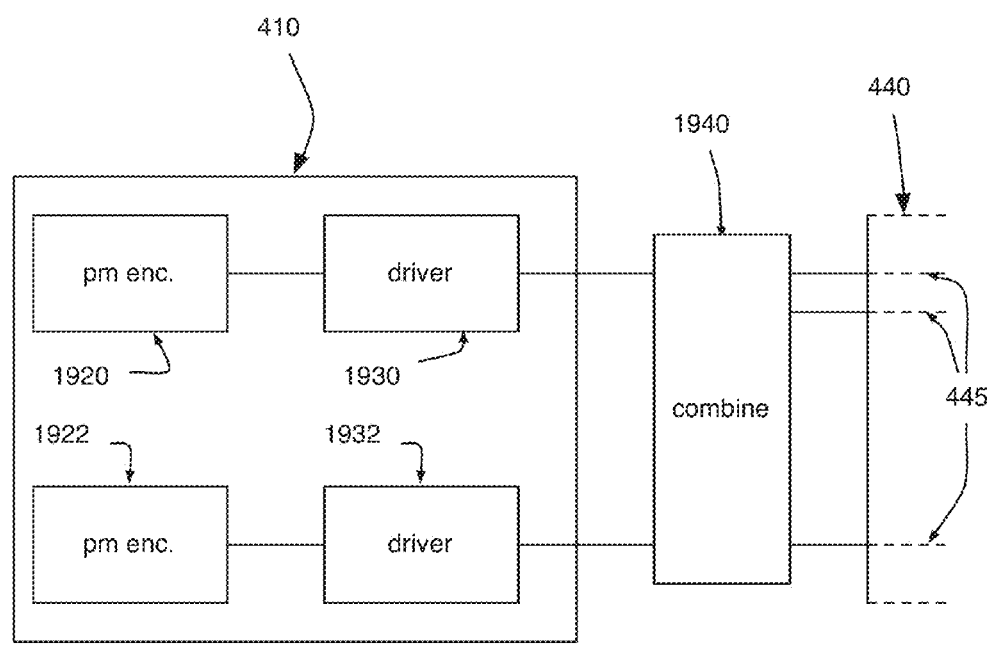
FIG. 17 illustrates a variation of a transmit unit wherein separate drivers appear prior to a combine unit.

FIG. 17 illustrates a variation of a transmit unit wherein separate drivers appear prior to a combine unit. In this embodiment, a transmit unit does not include an explicit combine unit. Instead, the transmit unit encodes using a superposition signaling code that comprises two layers. The transmit unit may comprise two encoders 1920, 1922 for the two permutation modulation codes defining the two layers of the superposition signaling code. The result of the encoder 1920 is input to a driver 1930 and the result of the encoder 1922 is input to a driver 1932. Both drivers 1930 and 1932 may drive wires of a communication bus independently. The actual combining is performed in combine unit 1940 and may be physical in nature.

Note that the addition of two currents that are sourced into the same conductor, the addition or averaging of voltages induced in a network comprising passive resistors, or the like will effect an addition or summation without explicit active circuit elements. The example of FIG. 17 can be easily extended to any number of layers of the superposition signaling code.

Figure 18:
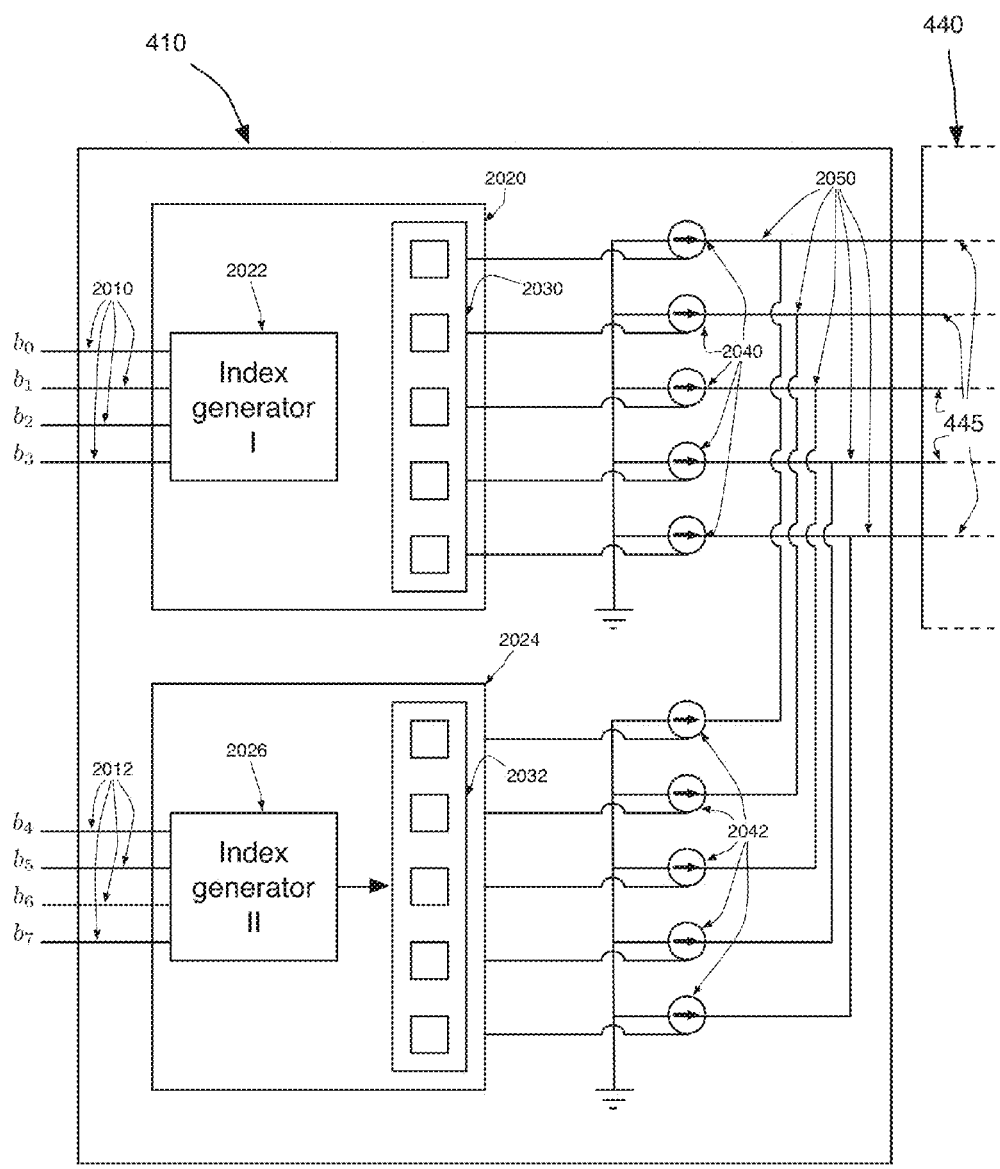
FIG. 18 illustrates a transmit unit that might be used as the transmit unit in the circuit of FIG. 3.

FIG. 18 illustrates a transmit unit that might be used as transmit unit 410 (see FIG. 3) and implements the 8b5w code with combining performed by a physical addition. The transmit unit comprises two encoders 2020, 2024. The inputs 2010 to the first encoder 2020 are the bits $b_0, \ldots, b_3$. These bits may be encoded into a permutation of the basis vector $x_0 = [1\ 0\ 0\ 0\ -1]$. For this purpose, the encoder 2020 may comprise an index generator 2022 and storage device 2030. The index generator 2022 may implement the process as exemplified in FIG. 7 to generate two indices. These two indices may be used to set the non-zero values corresponding to the permutation of $x_0$ in storage device 2030. The values stored and/or buffered in the storage device 2020 may be used to control the current that is sourced by the controlled current sources 2040 into the wires 445 of the communication bus 440.

The inputs 2012 to the second encoder 2024 are the bits $b_4, \ldots, b_7$. These bits may be encoded into a permutation of the basis vector $x_1 = [3\ 0\ 0\ 0\ -3]$. The encoder 2024 may comprise an index generator 2026 and storage device 2032. The index generator 2026 may implement the process as exemplified in FIG. 7 to generate two indices. These two indices may be used to set the non-zero values corresponding to the permutation of $x_1$ in storage device 2032. The values stored and/or buffered in the storage device 2032 may be used to control the current that is sourced by the controlled current sources 2042 into the wires 445 of the communication bus 440.

The final operation of encoding the 8b5w code comprises combining the permutations of $x_0$ and $x_1$. In the embodiment of FIG. 18, the operation of combining is performed in nodes 2050 where the currents of controlled current sources 2040, 2042 are superimposed to create signals transmitted on the bus according to the 8b5w code.

Signal-to-Digital Converter ("SDC")

Figure 19:
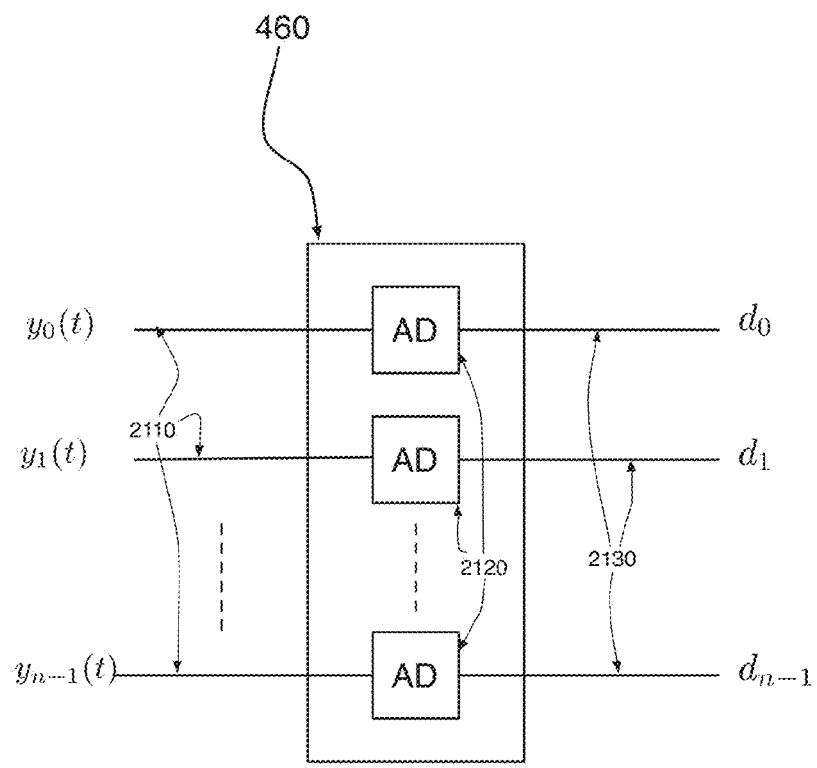
FIG. 19 illustrates an example Signal-to-Digital Converter ("SDC") as might be used for the SDC in the circuit of FIG. 3.

FIG. 19 illustrates an example Signal-to-Digital Converter ("SDC") as might be used for SDC 460 in the circuit of FIG. 3. A task of a SDC is to sense the signals on the bus and generate a digital representation for the word of the superposition signaling code that is transmitted on the communication bus.

As shown in FIG. 19, an SDC has inputs 2110 denoted by $y_0(t), \ldots, y_{n-1}(t)$. The SDC may comprise n analog-to-digital converters (ADCs) 2120 where the i-th ADC samples the i-th signal $y_i(t)$. The SDC may sample the signals $y_0(t), \ldots, y_{n-1}(t)$ at the optimal sample moment and generate n numbers that are denoted by $d_0, \ldots, d_{n-1}$. The numbers $d_0, \ldots, d_{n-1}$ may be a discrete estimate of the transmitted word from the superposition code. The resolution of the ADCs 2120 may be adjusted to the superposition signaling code used.

When, for instance, the number of different levels observed at each of the wires is equal to M, a decoder of a receive unit may choose the resolution of the ADC as a least $\log_2(M)$ bits. The SDC may also perform additional tasks such as amplification, filtering, equalization and clock recovery or any other functions.

The SDC may employ a joint conversion architecture across the wires to generate the numbers $d_0, \ldots, d_{n-1}$. Such a joint conversion architecture may lead to less hardware complexity and lower power consumption.

Decoding Superposition Signaling Codes

The input to a decoder can be the set of n numbers $d_0, \ldots, d_{n-1}$ which are output by an SDC. The numbers $d_0, \ldots, d_{n-1}$ may represent an estimate for the transmitted word from the superposition signaling code.

Figure 20:
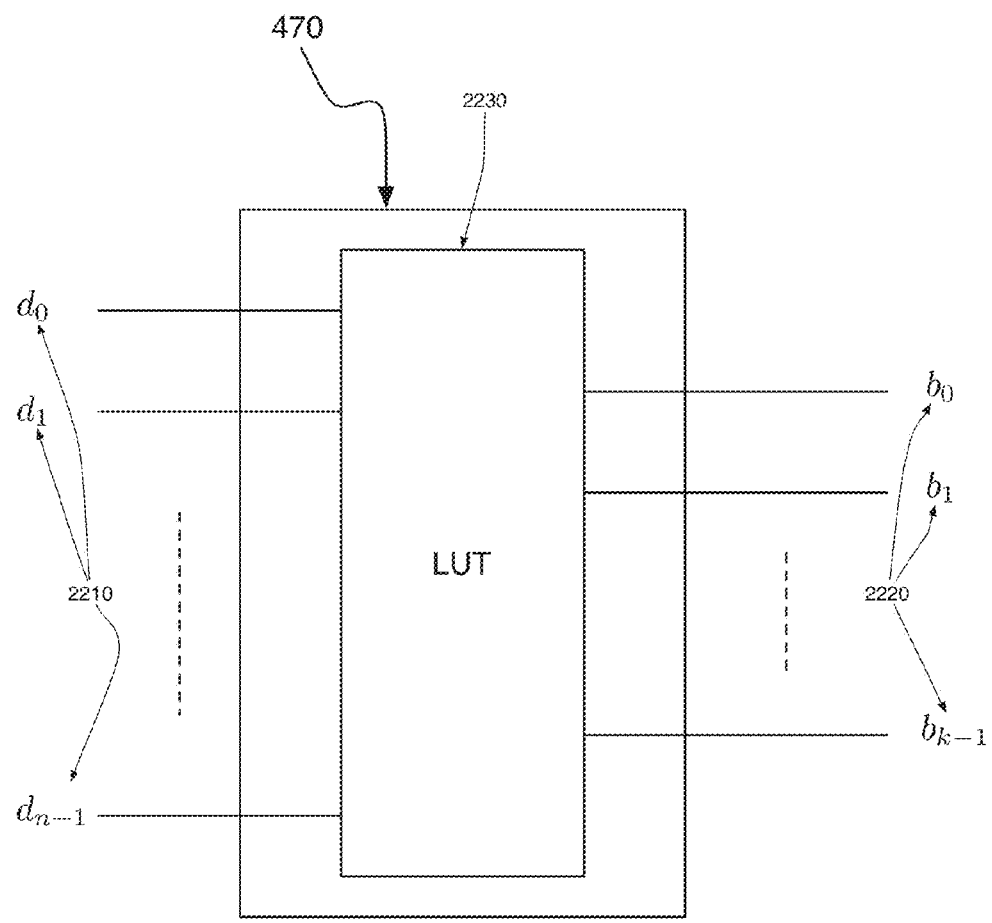
FIG. 20 illustrates an example decoder.

FIG. 20 illustrates an example decoder as might be used for decoder 470 in the circuit of FIG. 3. The inputs 2210 are used as an index in a look-up-table ("LUT") 2230 to perform decoding of the superposition signaling code. The LUT stores, for each input combination of $d_0, \ldots, d_{n-1}$, the corresponding set of original information bits $b_0, \ldots, b_{n-1}$. The outputs 2220 of the decoder may comprise these information bits.

The use of a LUT may not always be practical when the total number of codewords is large. To reduce complexity, the decoder might take advantage of the properties of the superposition signaling code and the underlying permutation modulation codes.

Figure 21:
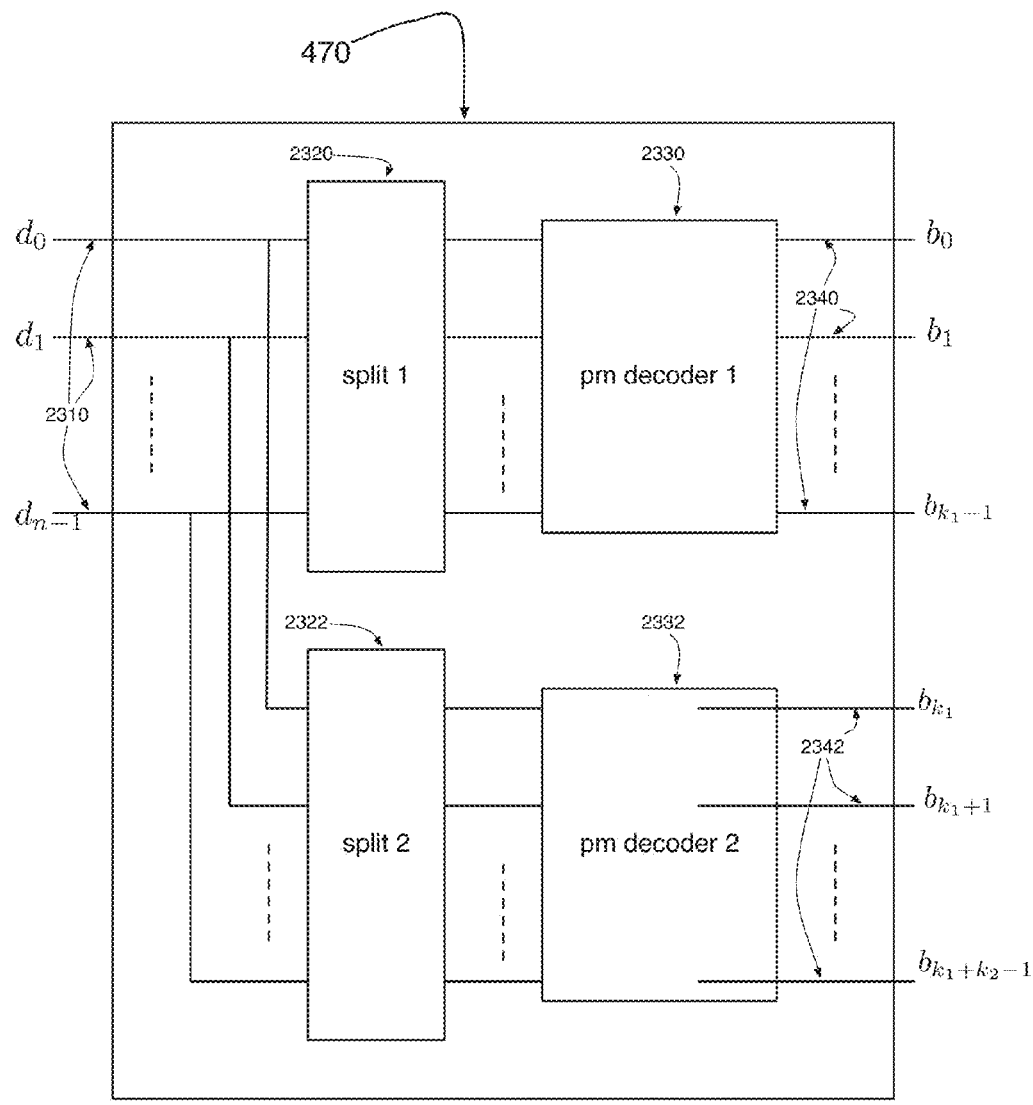
FIG. 21 illustrates a decoder that uses the properties of the underlying permutation modulation codes.

A preferred embodiment of a decoder that uses the properties of the underlying permutation modulation codes is shown in FIG. 21. The decoder of FIG. 21 may be used for a superposition signaling code comprising two layers. The inputs 2310 to the decoder are denoted by $d_0, \ldots, d_{n-1}$. The decoder comprises two split units 2320, 2322 whose inputs are $d_0, \ldots, d_{n-1}$. Split unit 2320 extracts from $d_0, \ldots, d_{n-1}$ information required to decode the first layer of the superposition signaling code, which is used by a PM decoder unit 2330. PM decoder unit 2330 decodes the permutation modulation code that defines the first layer of the superposition signaling code. Outputs 2340 of PM decoder unit 2330 comprise the $k_1-1$ decoded bits $b_0, \ldots, b_{k1-1}$. Split unit 2322 extracts from $d_0, \ldots, d_{n-1}$ information required to decode the second layer of the superposition signaling code, which is used by a PM decoder unit 2332. The PM decoder unit 2332 decodes the permutation modulation code that defines the second layer of the superposition signaling code. The outputs 2342 of decoder unit 2332 comprise the $k_2-1$ decoded bits $b_{k1}, \ldots, b_{k1+k2-1}$.

Figure 22:
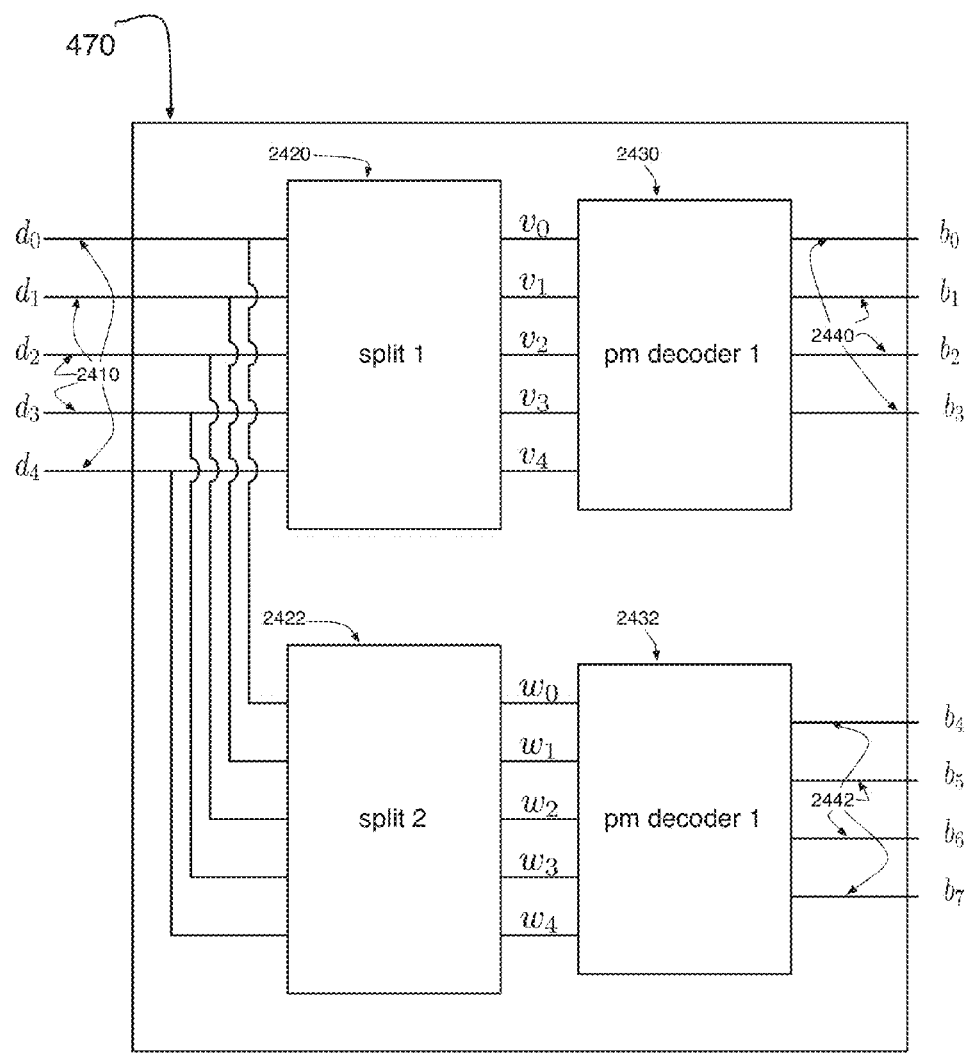
FIG. 22 illustrates a decoder for an 8b5w superposition signaling code.

FIG. 22 illustrates a decoder for a 8b5w superposition signaling code. The input of the decoder comprises the five numbers $d_0, \ldots, d_4$. A split unit 2420 generates five numbers $v_0, \ldots, v_4$, wherein as $v_i = d_i \pmod 3$ for $i=0,1,2,3,4$, wherein the operation "(mod 3)" maps its argument, x, to the unique integer a in $\{-1, 0, 1\}$ such that x−a is divisible by 3. In other words, the split unit returns $v_i=0$ if $d_i$ is a multiple of three, $v_i=-1$ if $d_i$ is one less than a multiple of three, and $v_i=1$ if $d_i$ is one more than a multiple of three.

The numbers $v_0, \ldots, v_4$ provide an estimate for the word of the permutation modulation code of the first layer of the 8b5w code. A PM decoder 2430 takes as its input the numbers $v_0, \ldots, v_4$ and generates the bits $b_0, \ldots, b_3$ as its output 2440. Split unit 2422 generates the five numbers $w_0, \ldots, w_4$ as shown by Equation 15, wherein the round(x) operation denotes the closest integer to x.

$$w_i = 3 \cdot \text{round}\left(\frac{x}{3}\right), i = 0, \ldots, 4. \quad \text{(Eqn. 15)}$$

The numbers $w_0, \ldots, w_4$ provide an estimate for the word of the permutation modulation code of the second layer of the 8b5w code. A PM decoder 2432 takes as its input the numbers $w_0, \ldots, w_4$ and generates the bits $b_4, \ldots, b_7$ as its output 2442. The outputs 2440, 2442 are the outputs of the decoder. PM decoders 2430, 2432 may implement the inverse of the process that is exemplified in FIG. 8 to decode the permutation modulation code.

FIG. 22 is an example for the 8b5w code. Similar principles may be applicable to decoders of other superposition signaling codes.

Some Advantages of Superposition Signaling Codes for Chip-to-Chip Communications The use of superposition signaling codes in chip-to-chip communications provides several advantages. First, superposition signaling codes provide resilience against common-mode noise and interference and the introduction of SSO noise may be minimized by a driver architecture that is matched to the superposition signaling code. Second, the pin-efficiency of superposition signaling codes may be several times larger than that of binary differential signaling. Third, the required transmission power burned by the drivers to allow for reliable communication is much less than competing signaling methods that achieve a pin-efficiency greater than r=0.5.

Noise Resilience

Several sources of noise in chip-to-chip communications have a component that is common on all wires of the communication bus. An example of such type of noise is interference and crosstalk that couples in from neighboring wires that are not part of the communication bus itself. Superposition signaling codes have resilience against common-mode noise and interference. Note that the inputs of the communication bus are generated according to Equation 1 and in case of common-mode noise and/or interference the received signals $y_0(t), \ldots, y_{n-1}(t)$ can be written as in Equation 16.

$$\begin{bmatrix} y_0(t) \\ \vdots \\ y_{n-1}(t) \end{bmatrix} = zp(t) + \begin{bmatrix} n_c(t) \\ \vdots \\ n_c(t) \end{bmatrix} \quad \text{(Eqn. 16)}$$

In Equation 16, the common-mode noise is denoted by $n_c(t)$. Effects such as frequency dependent attenuation might also be taken into account. However, these effects can be included and do not change the resilience against common-mode noise and interference. Since the codewords of a superposition signaling code sum all to zero, a set of signals $y'_0(t), \ldots, y'_{n-1}(t)$ can be formed as in Equation 17.

$$\begin{bmatrix} y'_0(t) \\ \vdots \\ y'_{n-1}(t) \end{bmatrix} = \begin{bmatrix} y_0(t) \\ \vdots \\ y_{n-1}(t) \end{bmatrix} - \frac{1}{n}\sum_{i=0}^{n-1} y_i(t) = zp(t) \quad \text{(Eqn. 17)}$$

For the set of signals $y'_0(t), \ldots, y'_{n-1}(t)$, the common-mode noise is cancelled.

Figure 23:
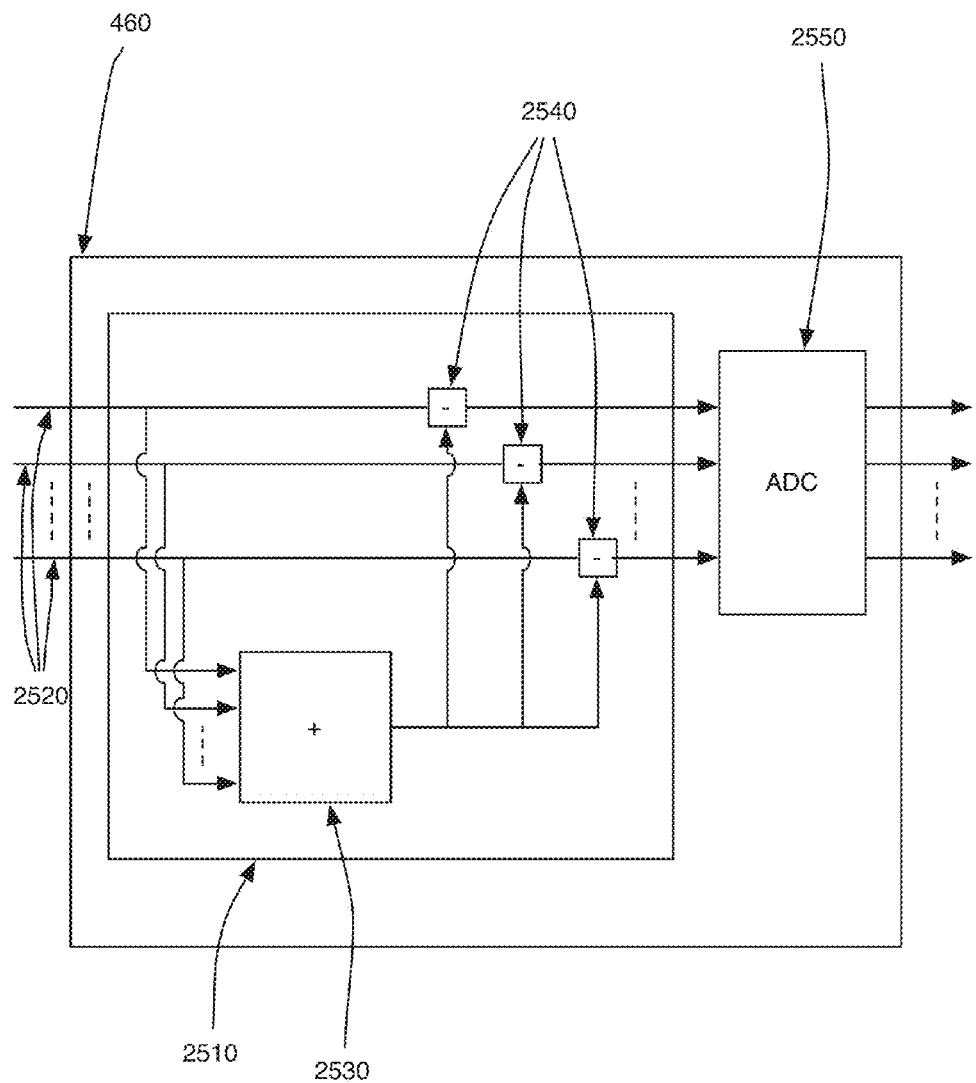
FIG. 23 illustrates an SDC that incorporates common-mode cancellation.

This type of common-mode noise cancellation may be performed explicitly. Such an embodiment is illustrated in FIG. 23. FIG. 23 exemplifies an SDC that incorporates a common-mode cancellation unit 2510. The inputs 2520 of the common-mode cancellation unit 2510 are summed and normalized by unit 2530. The result of the summation and normalization is sent to units 2540 that cancel the common-mode from each of the inputs 2520. The result is fed to an analog-to-digital converter (ADC) unit 2550 that performs the final stage of signal-to-digital conversion.

In a preferred embodiment, the ADC is designed in such a way that the specifics of the superposition signaling code are taken into account. The resolution of the ADC may, for instance, be matched to the superposition signaling code used. Furthermore, the ADC may be designed such that it performs a joint conversion across the wires. One may also employ a receiver architecture to detect the codeword of the superposition signaling code that is not sensitive to common-mode noise. Such receiver architecture implicitly cancels the common-mode noise and interference. Superposition signaling codes have an intrinsic resilience against common-mode noise and interference that may be exploited in hardware architectures.

A second advantage is that the intrinsic common-mode resilience of superposition signaling codes allows the transmitted word to be detected without a reference at the receiver. The reference may be generated by the received signals themselves. Note that unit 2530 in the circuit shown in FIG. 23 generates such a reference from the input signals 2520.

Figure 24:
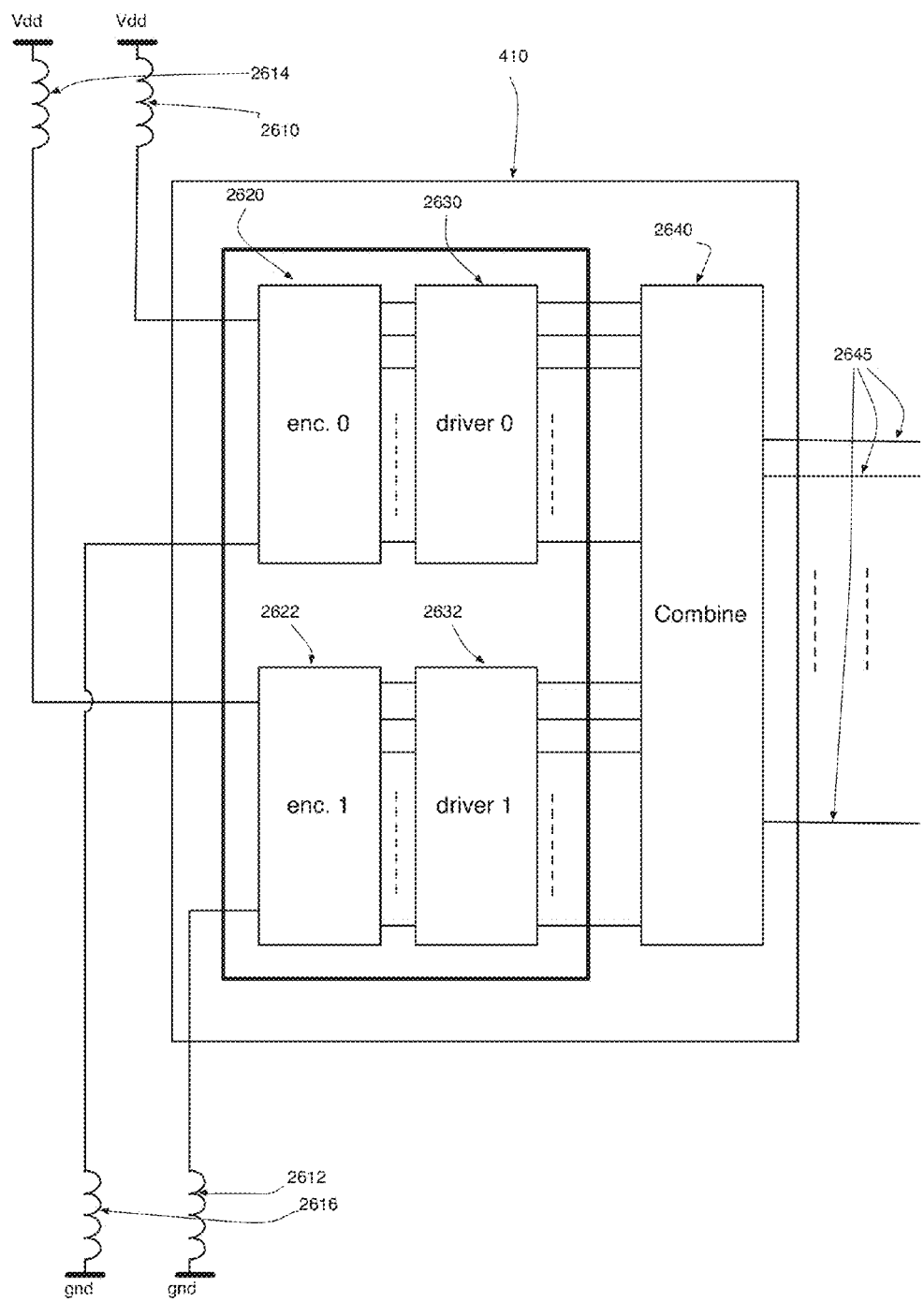
FIG. 24 illustrates a transmit unit that uses superposition signaling codes to minimize introduction of SSO noise.

A major problem with many signaling schemes for chip-to-chip communication is the introduction of SSO noise. Superposition signaling codes allow for architectures that minimize the introduction of SSO noise. A transmit unit that accomplishes this for a superposition signaling code comprising two layers is shown in FIG. 24. The transmit unit of FIG. 24 transmits on n wires 2645. The transmit unit generates codewords from a superposition signaling code where the basis vectors $x_0$ and $x_1$ are of size n. The transmit unit comprises an encoder 2620 that encodes information into a permutation of a basis vector $x_0$ and an encoder 2622 that encodes information into a permutation of a basis vector $x_1$. The result of encoder 2620 is forwarded to a driver unit 2630 that generates a sequence of signals $v_0(t), \ldots, v_{n-1}(t)$. These signals may correspond to currents or voltages and are forwarded to a combine unit 2640.

The result of encoder 2622 is forwarded to a driver unit 2632 that generates a sequence of signals $w_0(t), \ldots, w_{n-1}(t)$. These signals may correspond to currents or voltages and are forwarded to the combine unit 2640. The combine unit 2640 generates a sequences of signals $s_0(t), \ldots, s_{n-1}(t)$ by combining the signals $v_i(t)$ and with $w_i(t)$ according to Equation 18.

$$s_i(t) = v_i(t) + w_i(t), \text{ for } i = 0, \ldots, n-1 \quad \text{(Eqn. 18)}$$

As explained above in this disclosure, the combine unit may make use of the physical addition of signals $v_i(t)$ and with $w_i(t)$ to minimize hardware complexity.

The encoder 2620 and driver 2630 are both connected to Vdd and ground by parasitic inductors 2610 and 2612, respectively. The driver 2630 generates signals on the wires of the bus that correspond to permutations of $x_0$ and these signals may be proportional to the currents through parasitic inductors 2610 and 2612. Since the sum of $x_0$ is equal to zero, the variation of currents through parasitic inductors 2610 and 2612 is minimized. The encoder 2622 and driver 2632 are both connected to Vdd and ground by parasitic inductors 2614 and 2616, respectively. The variation of currents through parasitic inductors 2614 and 2616 is minimized also. This greatly reduces SSO.

Embodiments of drivers shown in FIGS. 13-15 may be used as the drivers 2630, 2632 and the resulting transmit unit may have a good SSO resilience.

Pin-Efficiency

In chip-to-chip communication systems, it is beneficial to increase the pin-efficiency. This has several advantages. First, for a target data rate, the symbol rate and/or number of wires can be lowered. In practice this often translates to lower cost of package and PCB. Second, a chip-to-chip communication system with a higher pin-efficiency can transmit at a lower signaling rate to achieve a predetermined aggregate bandwidth compared to a system that has a lower pin-efficiency. Being able to lower the signaling rate relaxes equalization, which in turn leads to power savings in terms of circuitry required for equalization.

A conventional method to increase the pin-efficiency is to use multi-level modulation. Multi-level modulation is relatively straightforward to combine with differential signaling but the downside is that a substantial amount of transmit energy is required as is shown below. Furthermore, at the receiver the detection of the different levels requires more complex circuitry that increases power consumption also. Superposition signaling codes allow one to achieve a high pin-efficiency while keeping the transmit power consumption low. Furthermore, power may be saved in the circuitry for detection of superposition signaling codes compared to the detection of multi-level signaling with multiple differential links. Table 5 lists the pin-efficiency of several superposition signaling codes comprising two layers. The table also shows the number of different levels that are observed per wire. For comparison the number of levels used for multi-level differential signaling to achieve at least the same pin-efficiency r is shown as well.

TABLE 5

| n | $x_0$ | $x_1$ | $\log_2(S)$ | r | Levels/wire | Multilevel DS levels |
|---|---|---|---|---|---|---|
| 4 | [−1 −1 1 1] | [−2 −2 2 2] | 5.17 | 1.29 | 4 | 6 |
| 5 | [−1 1 0 0 0] | [−3 3 0 0 0] | 8.64 | 1.73 | 9 | 11 |
| 6 | [−1 −1 −1 1 1 1] | [−2 −2 −2 2 2 2] | 8.64 | 1.44 | 4 | 8 |
| 8 | [−1 −1 1 1 0 0 0 0] | [−3 −3 3 3 0 0 0 0] | 17.43 | 2.18 | 9 | 21 |
| 9 | [−1 1 0 0 0 0 0 0 0] | [−3 3 0 0 0 0 0 0 0] | 12.34 | 1.37 | 9 | 7 |

As is apparent from Table 5, pin-efficiencies that are substantially larger than 0.5 and even larger than 1 are possible. Furthermore, for most superposition signaling codes, the number of levels observed at each wire is less than would be the case to achieve the same pin-efficiency with differential signaling and multilevel signaling. The only superposition code shown in Table 5 that results in more levels per wire also turns out to be very power-efficient.

To increase the pin-efficiency even further, one may use more than two layers. Table 6 illustrates some examples of superposition signaling codes where three layers are used.

TABLE 6

| n | $x_0$ | $x_1$ | $x_2$ | $\log_2(S)$ | r | Levels/wire | Multilevel DS levels |
|---|---|---|---|---|---|---|---|
| 5 | [-1 1 0 0 0] | [-3 3 0 0 0] | [-9 9 0 0 0] | 12.97 | 2.59 | 27 | 37 |
| 8 | [-1 -1 1 1 0 0 0 0] | [-3 -3 3 3 0 0 0 0] | [-9 -9 9 9 0 0 0 0] | 26.14 | 3.27 | 27 | 93 |
| 9 | [-1 1 0 0 0 0 0 0 0] | [-3 3 0 0 0 0 0 0 0] | [-9 9 0 0 0 0 0 0 0] | 18.51 | 2.06 | 27 | 18 |

As is apparent from Table 6, a transmit unit can obtain pin-efficiencies that are substantially larger than 1 when three layers are used. Furthermore, for most superposition signaling codes, the number of levels observed at each wire is less than would be the case to achieve the same pin-efficiency with differential signaling and multilevel signaling. The only superposition code that results in more levels per wire turns out to be very power-efficient. Superposition signaling codes allow achieving pin-efficiencies that are as high as multi-level differential signaling. However, as will be shown next, superposition signaling codes are substantially more power-efficient in terms of the transmission power required for a certain noise margin. Furthermore, efficient receiver architectures may be implemented that use the properties of the superposition signaling code to achieve additional power savings.

Power Consumption and Noise Margin

Superposition signaling codes allow for a large reduction in power consumption of the drivers compared to conventional signaling methods such as differential signaling. To illustrate this, a general embodiment for a driver is considered that may be used to implement differential signaling, multi-level differential signaling, schemes based on superposition modulation codes and some conventional schemes. To compare the different signaling schemes, it is assumed that they operate at the same noise margin. There are several ways to define the noise margin and for the purpose of this disclosure it is assumed that the minimum separation between the levels observed at each of the wires is normalized to one.

Driver Embodiments for Driver Power Comparison

Figure 25:
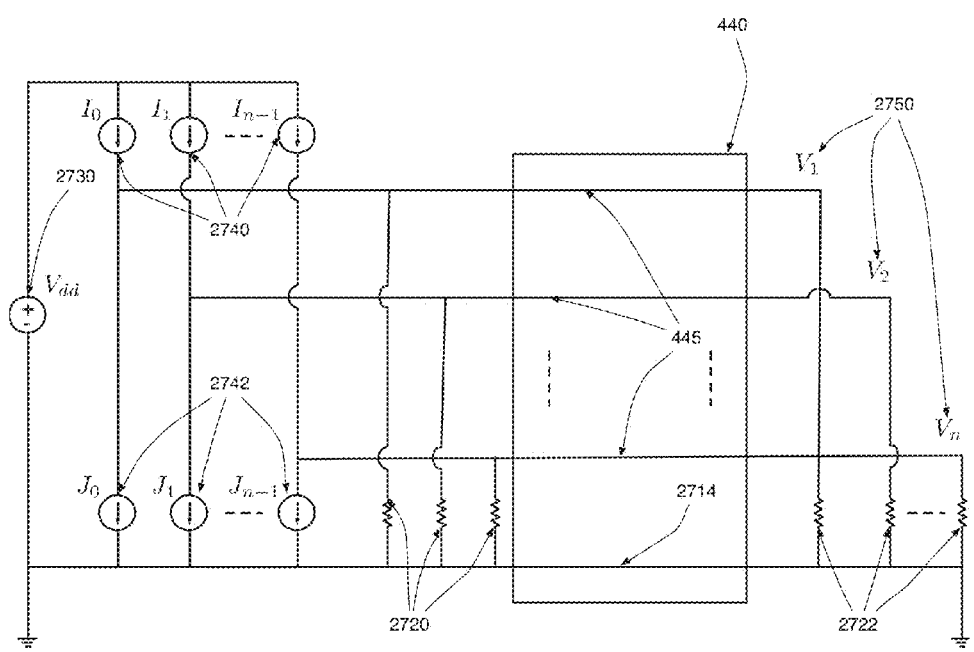
FIG. 25 illustrates an embodiment of a general driver that drives n bus wires.

A preferred embodiment of a general driver that drives n bus wires is exemplified in FIG. 25. The driver exemplified in FIG. 25 may be used to implement differential signaling, multi-level differential signaling, schemes based on superposition signaling codes or other signaling methods. The communication bus 440 comprises n wires 445 and a reference wire 2714. The reference wire 2714 might not be an explicit part of the bus itself. The reference wire 2714 may be, for instance, ground and voltages may be defined with respect to this reference wire 2714. The communication bus may be terminated at the transmitter by resistors 2720 and at the receiver by resistors 2722. The energy source of the driver is the voltage source 2730. The voltage source 2730 supplies a voltage equal to Vdd. The signals that are transmitted on the wires of the bus are defined by the current sources 2740 and the current sources 2742. Each of the current sources 2740 sources a current of strength $I_i$ into the ith wire and each of the current sources 2742 sinks a current of strength $J_i$ from the ith wire. The numbers $I_0, \ldots, I_{n-1}$ and $J_0, \ldots, d_{n-1}$ define the current sources 2740 and 2742. Furthermore, they are larger than zero and satisfy Equation 19.

$$\sum_{i=0}^{n-1} I_i = \sum_{i=0}^{n-1} J_i \quad \text{(Eqn. 19)}$$

When input of the communication bus is generated according to Equation 1, the numbers $I_0, \ldots, I_{n-1}$ and $J_0, \ldots, J_{n-1}$ that define the current sources 2740 and 2742 are given by Equation 20.

$$I_i = \frac{|z_i| + z_i}{2} \quad \text{(Eqn. 20)}$$

$$J_i = \frac{|z_i| - z_i}{2}$$

In Equation 20, $z_i$ denotes the i-th position of z. The energy for driving the bus wires is supplied by the voltage source 2730 and when the bus inputs are generated according to Equation 1, the instantaneous power consumed, denoted by P(t), may be written as shown by Equation 21.

$$P(t) = Vdd \cdot p(t) \cdot \sum_{i=0}^{n-1} I_i = Vdd \cdot p(t) \cdot \frac{\|z\|_1}{2} \quad \text{(Eqn. 21)}$$

In Equation 21, $\|z\|_1$ denotes the L1-norm of z. In a chip-to-chip communication system, Vdd and p(t) may be fixed and the power consumption determined by $\|z\|_1$. In comparing different chip-to-chip communication schemes, one may assume that Vdd is equal to one and p(t) is a constant function that has value one. At the receiver side, the voltages $V_0, \ldots, V_{n-1}$ are sensed and these are proportional to the vector z. The constant of proportionality is dependent on the values of the termination resistors 2722 and the loss on the wires 2712. For comparing the power consumption of different signaling methods, one may assume that all resistors 2722 have the same value that is equal to 1. In this case, the observed voltage $V_i$ is equal to $V_i = R \cdot z_i = z_i$.

Practical wires have losses. Furthermore, termination resistors 2722 with a value close to 50 ohms are more likely. However, for comparing different signaling schemes, one can neglect these loses since they are the same for the signaling schemes under comparison. For the same reason, the exact value of the termination resistors 2722 is irrelevant for the comparison.

In a preferred embodiment, one may want to perform combining in analog to obtain resilience against SSO. A preferred embodiment for such a driver is exemplified in FIG. 26 for the case of a bus communication system that employs a superposition signaling code comprising two layers. The communication bus 440 comprises n wires 445 and a reference 2814. The reference wire 2814 may not be an explicit part of the bus itself. The reference wire 2814 may be for instance ground and voltages may be defined with respect to this reference wire 2814. The communication bus 440 may be terminated at the transmitter by resistors 2820. The energy source of the driver is the voltage source 2830. The voltage source 2830 supplies a voltage equal to Vdd. The signals that are transmitted on the wires of the bus are defined by the current sources 2840, 2842, 2844 and 2846. The current sources 2840 and 2844 source a current of strength $I_{1i}$ and $I_{2i}$, respectively, into the ith wire. The current sources 2842 and 2846 sink a current of size $J_{1i}$ and $J_{2i}$, respectively, from the ith wire. The numbers $I_{1l}, \ldots, I_{1n}, I_{2l}, \ldots I_{2n}, J_{1l}, \ldots, J_{1n}$ and $J_{2l}, \ldots, J_{2n}$ are larger than zero and satisfy Equation 22.

$$\sum_{i=1}^{n} I_{1i} = \sum_{i=1}^{n} J_{1i} \qquad \text{(Eqn. 22)}$$

$$\sum_{i=1}^{n} I_{2i} = \sum_{i=1}^{n} J_{2i}$$

When the input of the communication bus is generated according to Equation 2, the numbers $I_{1l}, \ldots, I_{1n}, I_{2l}, \ldots, I_{2n}, J_{1l}, \ldots, J_{1n}$ and $J_{2l}, \ldots, J_{2n}$ that define the current sources 2840, 2842, 2844 and 2846 are given by Equation 23.

$$I_{1i} = \frac{|x_{0i}| + x_{0i}}{2} \qquad \text{(Eqn. 23)}$$

$$J_{1i} = \frac{|x_{0i}| - x_{0i}}{2}$$

$$I_{2i} = \frac{|x_{1i}| + x_{1i}}{2}$$

$$J_{2i} = \frac{|x_{1i}| - x_{1i}}{2}$$

In Equation 23, $x_{0i}$ denotes the ith position of $x_0$ and $x_{1i}$ denotes the ith position of $x_1$.

Power Consumption of Multi-Level Differential Signaling

In differential signaling and multi-level differential signaling, the signals transmitted on the bus have the form shown in Equation 24.

$$\begin{bmatrix} s_0(t) \\ s_1(t) \end{bmatrix} = \begin{bmatrix} -1 \\ 1 \end{bmatrix} \cdot x \cdot p(t) \qquad \text{(Eqn. 24)}$$

In Equation 24, x is an element from a pulse-amplitude modulation (PAM) signal constellations S. Other multi-level signal constellations S may be used for multi-level differential signaling. A family of PAM constellations that is often used is defined Equation 25.

$$S = \frac{1}{2} \cdot \{-M + 1 + 2i : i = 0, \ldots, M - 1\} \qquad \text{(Eqn. 25)}$$

In Equation 25, M denotes the number of levels and M is generally a power of two. The minimum separation between the different levels of the constellation symbols is normalized to one. To generate the multi-level signals for transmission on the bus according to the general driver shown in FIG. 26 one may make use of the fact that any $x \in S$ can be written as shown in Equation 26.

$$x = \frac{1}{2} \sum_{i=0}^{\log_2 M} b_i 2^i \qquad \text{(Eqn. 26)}$$

In Equation 26, $b_i$ is a number equal to either 1 or −1 and may represent a bit. This also shows that differential signaling can be seen as a special case of a superposition signaling code comprising $l = \log_2(M)$ layers and where the i-th basis vector is given by Equation 27.

$$x_i = 2^{i-1} \begin{bmatrix} -1 \\ 1 \end{bmatrix} \qquad \text{(Eqn. 27)}$$

However, differential signaling is not considered as a superposition signaling code since only two permutations of each of the basis vectors are used. From this, one can deduce that the driver architecture exemplified in FIG. 26 may implement multi-level differential signaling. For multi-level differential signaling, the power consumed in the driver when the separation between the different constellation symbols is 1 is given by Equation 28.

$$P_S = \frac{M^2 - 1}{6} \qquad \text{(Eqn. 28)}$$

Power Consumption of Superposition Signaling Codes

In a preferred embodiment where a superposition signaling code with two layers is used, the vector z is generated as shown by Equation 29 (which is the same as Equation 6).

$$z = P_0(x_0) + P_1(x_1) \qquad \text{(Eqn. 29)}$$

The instantaneous power consumed, denoted by P(t), can be written as shown in Equation 30.

$$P(t) = V_{dd} \cdot p(t) \cdot \left( \sum_{i=0}^{n-1} I_{1_i} + \sum_{i=0}^{n-1} J_{1_i} \right) = V_{dd} \cdot p(t) \cdot \frac{\|x_0\|_1 + \|x_1\|_1}{2}. \qquad \text{(Eqn. 30)}$$

Per Equation 30, the power consumption is proportional to the sum of L1 norms of $x_0$ and $x_1$. When a superposition signaling code with l layers is used, the expression for the instantaneous power consumption becomes as shown in Equation 31.

$$P(t) = V_{dd} \cdot p(t) \cdot \left( \sum_{i=0}^{n-1} I_{1_i} + \sum_{i=0}^{n-1} J_{1_i} \right) = V_{dd} \cdot p(t) \cdot \frac{1}{2} \cdot \sum_{i=0}^{l-1} \|x_i\|_1. \qquad \text{(Eqn. 31)}$$

The part that is dependent on the signal constellation S that the superposition signaling code defines is denoted by Equation 32

$$P_S = \frac{1}{2} \cdot \sum_{i=0}^{l-1} \|x_i\|. \qquad \text{(Eqn. 32)}$$

Once the noise margin is equal for different signaling methods, a key parameter is the amount of energy expended per bit, $E_b$, as in $E_b = (P_S/r)$.

Comparison of Driver Power Consumption

Figure 26:
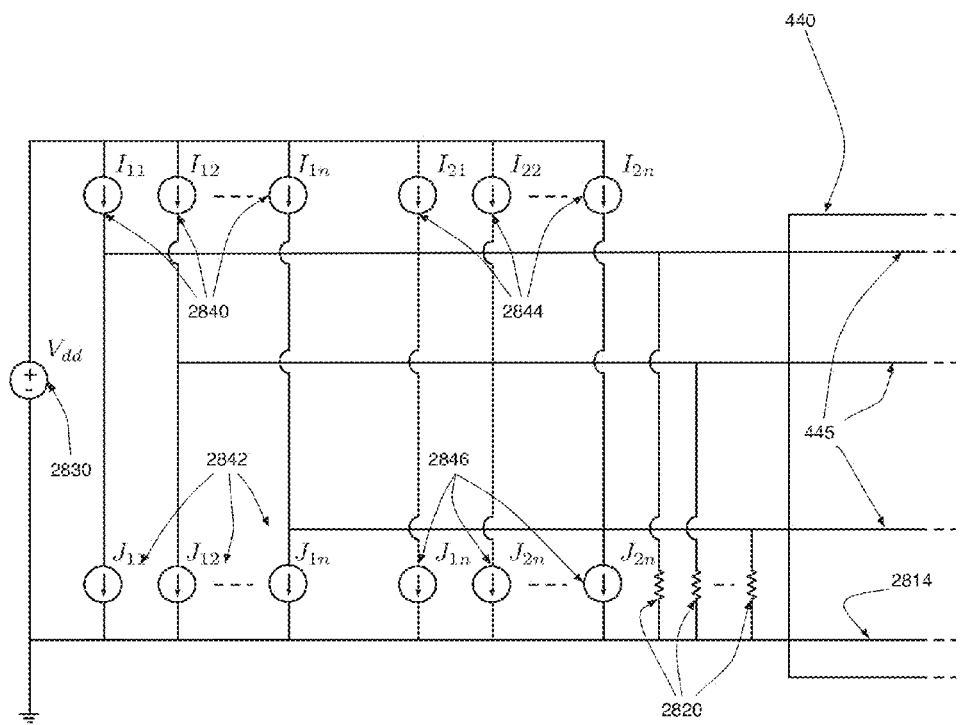
FIG. 26 illustrates a driver in which combining is performed in analog.

For multi-level differential signaling the power consumed per bit of the general driver shown in FIG. 26 is given in Table 7 for several values of M.

TABLE 7

| M | $\log_2(S)$ | R | $E_b$ |
|---|---|---|---|
| 2 | 1 | 0.5 | 1.0 |
| 4 | 2 | 1.0 | 2.5 |
| 8 | 3 | 1.5 | 4.0 |
| 16 | 4 | 2.0 | 10.0 |
| 32 | 5 | 2.5 | 68.0 |

The power consumption of the driver for several superposition signaling codes comprising two layers is shown in Table 8.

TABLE 8

| n | $x_0$ | $x_1$ | $\log_2(S)$ | r | $E_b$ |
|---|---|---|---|---|---|
| 4 | [−1 −1 1 1] | [−2 −2 2 2] | 5.17 | 1.29 | 1.16 |
| 5 | [−1 1 0 0 0] | [−3 3 0 0 0] | 8.64 | 1.73 | 0.46 |
| 6 | [−1 −1 −1 1 1 1] | [−2 −2 −2 2 2 2] | 11.81 | 1.97 | 0.76 |
| 8 | [−1 −1 1 1 0 0 0 0] | [−3 −3 3 3 0 0 0 0] | 17.43 | 2.18 | 0.46 |
| 9 | [−1 1 0 0 0 0 0 0 0] | [−3 3 0 0 0 0 0 0 0] | 12.34 | 1.37 | 0.32 |

The power used per transmitted bit of superposition signaling codes is up to a factor of 10 less than that of multi-level differential signaling. A circuit can provide substantial power savings by using superposition signaling codes instead of multi-level differential signaling. Hence superposition signaling codes provide a good resilience against various types of noise while keeping the required driver power consumption low. Furthermore, several embodiments have been disclosed that result in low hardware complexity.

Additional Applications of Superposition Signaling Codes

As one of skill in the art will recognize superposition signaling codes provide several advantages when used to transmit information in communication systems. Superposition signaling codes are useful when information is transmitted in quantities of k bits on multiple physical channels of communication. The use of superposition signaling codes provides resilience against several types of noise and allows for very low power communications.

Each of the physical channels is referred to as a wire in this application and the set of wires constitutes the communication bus. However, one should keep in mind that these wires may include the whole path from transmitting IC to receiving IC. This implies that for instance bond wires, strip lines, pins, etc. may be included in this physical channel constituting the wire. Furthermore, these ICs may be located in the same device, may be stacked on top of each other in a package-on-package configuration, or even be integrated on the same die. In the latter case the ICs are really two components of the same chip.

Each of the wires constituting the communication bus may be a medium carrying electrical signals. However, the wire may also comprise an optical fiber that carries electrical signals or a combination. Furthermore, a wire may in part carry electrical signals and in another part carry optical signals. Another possibility is that communication between two ICs takes place wireless. What is important that in the end two ICs communicate with another over a plurality of wires where the wire is understood to be a very general term for a path between transmitting and receiving IC.

The preferred embodiments mostly illustrate the use of superposition signaling codes for chip-to-chip communications. However, this should not been seen in any way to limit the scope of present invention. The methods disclosed in this application may also be used in other communication settings such as wireless communications or optical communications. Furthermore, superposition signaling codes may also be used in storage of information.

What is claimed is:

1. A method for transmitting information over a communication bus, the method comprising:
    receiving a first set of signals representing the information as a plurality of bits;
    mapping, using an encoder, a first set of the plurality of bits to a first vector in a first set of vectors, the first set of vectors part of a first permutation modulation code, wherein the first set of the plurality of bits are mapped to the first vector according to a first set of indices, the first set of indices generated at least in part by an index generator operating on the first set of the plurality of bits;
    mapping using the encoder, a second set of the plurality of bits not in the first set of the plurality of bits to a second vector in a second set of vectors, the second set of vectors part of a second permutation modulation code, wherein the second set of the plurality of bits are mapped to the second vector according to a second set of indices, the second set of indices generated at least in part by the index generator operating on the second set of the plurality of bits; and
    providing a second set of signals for transmission over the communication bus, wherein the second set of signals is based on a vector sum of the first and second vectors, wherein the vector sum forms a codeword of a superposition signaling code that is based on the first and second sets of vectors, and wherein each signal of the second set is transmitted over a respective wire of the bus.

2. The method of claim 1, wherein a pin-efficiency is larger than 1.

3. The method of claim 1, wherein a pin-efficiency is larger than 1.5.

4. The method of claim 1, wherein the index generator generates the first and second sets of indices corresponding to a permutation of a basis vector.

5. The method of claim 1, wherein the mapping includes combining a plurality of secondary codewords to form the codeword of the superposition signaling code, wherein the plurality of secondary codewords are combined as voltages.

6. The method of claim 1, wherein the vector sum is formed by combining currents associated with the first and second vectors.

7. The method of claim 1, wherein the vector sum is formed by wiring connections associated with the first and second vectors.

8. The method of claim 1, wherein a number of components of the first vector is equal to a number of components of the second vector.

9. The method of claim 1, wherein a number of components of the first vector is not equal to a number of components of the second vector.

10. The method of claim 1, further comprising:
    mapping, using the encoder, a third set of the plurality of bits not in the first or second set to a third vector in a third set of vectors, the third set of vectors selected from a third permutation modulation code, wherein the second set of signals is based on a vector sum of the first, second, and third vectors.

11. A method for encoding a predetermined number, k, of bits of information into a codeword of a superposition signaling code that is defined by a first basis vector of predetermined size, $n_1$, and a second basis vector of predetermined size, $n_2$, the method comprising:

providing a first encoder for a permutation modulation code defined by the first basis vector, the first encoder including a first index generator;
providing a second encoder for a permutation modulation code defined by the second basis vector, the second encoder including a second index generator;
receiving a first set of signals representing the k bits of information;
dividing the signals into a first part and a second part wherein the first part represents a predetermined number of $k_1$ bits and the second part represents a predetermined number of $k_2$ bits;
generating a first permutation modulation codeword by applying the first part to the first index generator of the first encoding circuit;
generating a second permutation modulation codeword by applying the second part to the second index generator of the second encoding circuit; and
combining the first permutation modulation codeword of the first encoding circuit and the second permutation modulation codeword of the second encoding circuit, wherein the combining is based on by a superposition of the first and second permutation modulation codewords.

12. The method of claim 11, wherein the superposition signaling code has a pin-efficiency of at least 1.

13. The method of claim 11, wherein the superposition signaling code has a pin-efficiency of at least 1.6.

14. The method of claim 11, wherein the combining is performed by superimposing currents in wires of a multi-wire communication bus.

15. The method of claim 11, wherein a number of components of the first vector is equal to a number of components of the second vector.

16. The method of claim 11, wherein a number of components of the first vector is not equal to a number of components of the second vector.

17. A communication system for transmitting a superpositioning codeword belonging to a superposition signaling code, the communication system comprising:
a communication bus with an integer, n, independent signal paths for signal transmission;
means for generating a first codeword belonging to a first permutation-modulation codeword set;
means for generating a second codeword belonging to a second permutation-modulation codeword set;
means for generating the superpositioning codeword representing a sum of the first and second codewords; and
means for transmitting the superposition codeword over the communication bus.

18. The communication system of claim 17, wherein the communication system transmits with a pin-efficiency of 1.

19. The communication system of claim 17, wherein the communication system transmits with a pin-efficiency of 1.6.

* * * * *